US012335756B2

(12) United States Patent
Hwang et al.

(10) Patent No.: US 12,335,756 B2
(45) Date of Patent: Jun. 17, 2025

(54) APPARATUS AND METHOD FOR LOCALIZATION OF TERMINAL IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 17/608,006

(22) PCT Filed: Apr. 29, 2020

(86) PCT No.: PCT/KR2020/005645
§ 371 (c)(1),
(2) Date: Nov. 1, 2021

(87) PCT Pub. No.: WO2020/222518
PCT Pub. Date: Nov. 5, 2020

(65) Prior Publication Data
US 2022/0279367 A1    Sep. 1, 2022

(30) Foreign Application Priority Data
May 2, 2019    (KR) .................. 10-2019-0051847

(51) Int. Cl.
*H04W 24/08*    (2009.01)
*H04L 5/00*     (2006.01)
*H04W 4/029*    (2018.01)

(52) U.S. Cl.
CPC ........... *H04W 24/08* (2013.01); *H04L 5/0048* (2013.01); *H04W 4/029* (2018.02)

(58) Field of Classification Search
CPC ...... H04W 24/08; H04W 4/029; H04L 5/0048
See application file for complete search history.

(56) References Cited

U.S. PATENT DOCUMENTS

2014/0349582 A1    11/2014    Xiao et al.
2017/0366244 A1    12/2017    Lee et al.
(Continued)

FOREIGN PATENT DOCUMENTS

| CN | 106507472 A  | 3/2017 |
| EP | 3 874 293 A2 | 9/2021 |
| WO | 2020/092719 A3 | 5/2020 |

OTHER PUBLICATIONS

3GPP TS 36.214 V16.2.0; 3rd Generation Partnership Project; Technical Specification Group Radio Access Network; Evolved Universal Terrestrial Radio Access (E-UTRA); Physical layer; Measurements, Mar. 2021, (Release 16).

(Continued)

*Primary Examiner* — Curtis B Odom
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments of the disclosure, an operation method of a terminal in a wireless communication system includes: receiving positioning reference signal (PRS) configuration information related to a reference cell and one or more neighboring cells with respect to the terminal; receiving a message for requesting PRS measurement; in response to the receiving of the message, determining, based on the PRS configuration information, an RSTD between transmission time of a PRS received through a first beam of the reference cell, and transmission time of a PRS received through a second beam of each of the one or more neighboring cells; and transmitting measurement information including the RSTD to a base station.

20 Claims, 17 Drawing Sheets

(56) References Cited

U.S. PATENT DOCUMENTS

| | | |
|---|---|---|
| 2018/0213350 A1 | 7/2018 | Pon et al. |
| 2019/0037529 A1* | 1/2019 | Edge ..................... G01S 1/0428 |
| 2019/0101615 A1 | 4/2019 | Tenny |
| 2020/0014487 A1* | 1/2020 | Akkarakaran .... H04W 72/0446 |
| 2020/0145977 A1* | 5/2020 | Kumar ................ H04W 56/001 |
| 2022/0150865 A1* | 5/2022 | Cha ......................... G01S 5/011 |

OTHER PUBLICATIONS

3GPP TS 36.355 V16.0.0; 3rd Generation Partnership Project; Technical Specification Group Radio Access Network; Evolved Universal Terrestrial Radio Access (E-UTRA); LTE Positioning Protocol (LPP), Jul. 2020, (Release 16).

CATT; NR RAT-dependent DL Positioning; Discussion and Decision; 3GPP TSG RAN WG1 Ad-Hoc Meeting 1901; R1-1900310, Jan. 25, 2019, Taipei, Taiwan.

Qualcomm Incorporated; Evaluation results for RAT-dependent positioning Techniques; Discussion and Decision; 3GPP TSG RAN WG1 #96; R1-1903342; Mar. 1, 2019, Athens, Greece.

CATT; Summary of UE and gNB measurements for NR Positioning; Discussion and Decision; 3GPP TSG RAN WG1 Meeting #96bis; R1-1905601; Apr. 12, 2019, Xi'an, China.

Lg Electronics, Discussions on UE and gNB measurements for NR Positioning, 3GPP TSG RAN WG1 #96bis, R1-1904201, Apr. 3, 2019, Xi'an, China.

CATT, UE and gNB measurements for NR Positioning, 3GPP TSG RAN WG1 Meeting#96bis, R1-1905348, Apr. 3, 2019, Xi'an, China.

CATT, Summary#3 of UE and gNB measurements for NR Positioning, 3GPP TSG RAN WG1 Meeting #96bis, R1-1905808, Apr. 15, 2019, Xi'an, China.

European Search Report dated Jun. 1, 2022, issued in European Application No. 20798279.4.

Intel Corporation; Summary for NR-Positioning AI-7.2.10.1.1 DL only Based Positioning; 3GPP TSG RAN WG1 Meeting #96; R1-1903394; Athens, Greece; Feb. 25-Mar. 1, 2019.

3GPP; 3rd Generation Partnership Project; Technical Specification Group Radio Access Network; Study on NR positioning support (Release 16); 3GPP TR 38.855; V2.1.0 (Mar. 2019); Valbonne, France; Mar. 2019.

Chinese Office Action with English translation dated Feb. 19, 2024; Chinese Appln. No. 202080032815.1.

Korean Office Action with English translation dated May 24, 2024; Korean Appln. No. 10-2019-0051847.

Chinese Office Action with English translation dated Nov. 15, 2024; Chinese Appln. No. 202080032815.1.

European Communication pursuant to Article 94(3) EPC dated Dec. 23, 2024; European Appln No. 20 798 279.4-1215.

Korean Office Action with English translation dated Jan. 15, 2025; Korean Appln. No. 10-2019-0051847.

Zte et al.; NR E-CID positioning enhancement; 3GPP TSG RAN WG2 Meeting #105 bis; R2-1903363; Xi'an, China; Apr. 8-12, 2019.

Chinese Office Action with English translation dated Aug. 14, 2024; Chinese Appln. No. 202080032815.1.

Chinese Office Action with English translation dated Feb. 14, 2025; Chinese Appln. No. 202080032815.1.

* cited by examiner

APPARATUS AND METHOD FOR LOCALIZATION OF TERMINAL IN WIRELESS COMMUNICATION SYSTEM

TECHNICAL FIELD

The disclosure generally relates to a wireless communication system and, more particularly, to an apparatus and a method for localization of terminal in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Since a terminal is movable in a wireless communication system, mobility management for the terminal may be required in order to provide an appropriate quality of service to the terminal. As a part of the mobility management, localization of terminal may be required.

DISCLOSURE OF INVENTION

Technical Problem

Based on the above-described discussion, the disclosure provides an apparatus and a method for localization of a terminal in a wireless communication system.

In addition, the disclosure provides an apparatus and a method for localization of a terminal, based on a timing difference between signals transmitted through a beam in a wireless communication system.

In addition, the disclosure provides an apparatus and a method for localization of a terminal, based on a signal strength of each of signals transmitted through a beam in a wireless communication system.

Solution to Problem

In accordance with various embodiments of the disclosure, an operation method of a terminal in a wireless communication system includes: receiving positioning reference signal (PRS) configuration information related to a reference cell and one or more neighboring cells with respect to the terminal; receiving a message for requesting PRS measurement; in response to the receiving of the message, determining, based on the PRS configuration information, a reference signal timing difference (RSTD) between transmission time of a PRS received through a first beam of the reference cell and transmission time of a PRS received through a second beam of each of the one or more neighboring cells; and transmitting measurement information including the RSTD, to a base station.

In accordance with various embodiments of the disclosure, an operation method of a location management function (LMF) device includes: transmitting positioning reference signal (PRS) configuration information related to a reference cell and one or more neighboring cells with respect to a terminal; transmitting a message for requesting PRS measurement by the terminal; receiving measurement information including a reference signal timing difference (RSTD) between transmission time of a PRS received through a first beam of the reference cell, and transmission time of a PRS received through a second beam of each of the one or more neighboring cells, the RSTD being determined based on the PRS configuration information; and localizing the terminal, based on the RSTD.

In accordance with various embodiments of the disclosure, a terminal in a wireless communication system includes: a transceiver configured to receive positioning reference signal (PRS) configuration information related to a reference cell and one or more neighboring cells with respect to the terminal, and receive a message for requesting PRS measurement; and at least one processor configured to, in response to the receiving of the message, determine, based on the PRS configuration information, a reference signal timing difference (RSTD) between transmission time of a PRS received through a first beam of the reference cell, and transmission time of a PRS received through a second beam of each of the one or more neighboring cells, wherein the transceiver transmits measurement information including the RSTD, to a base station.

In accordance with various embodiments of the disclosure, a location management function (LMF) device in a wireless communication system includes: a transceiver configured to transmit positioning reference signal (PRS) configuration information related to a reference cell and one or more neighboring cells with respect to a terminal, transmit a message for requesting PRS measurement by the terminal, and receive measurement information including a reference signal timing difference (RSTD) between transmission time of a PRS received through a first beam of a reference cell, and transmission time of a PRS received through a second beam of each of the one or more neighboring cells, the RSTD being determined based on the PRS configuration information; and at least one processor configured to localize the terminal, based on the RSTD.

Advantageous Effects of Invention

An apparatus and a method according to various embodiments of the disclosure localizes the terminal, based on a result obtained by measuring a positioning reference signal (PRS) by a terminal, and thus enables accurate localization of the terminal.

Effects obtainable from the disclosure may not be limited to the above mentioned effects, and other effects which are

BEST MODE FOR CARRYING OUT THE INVENTION

Figure 1:
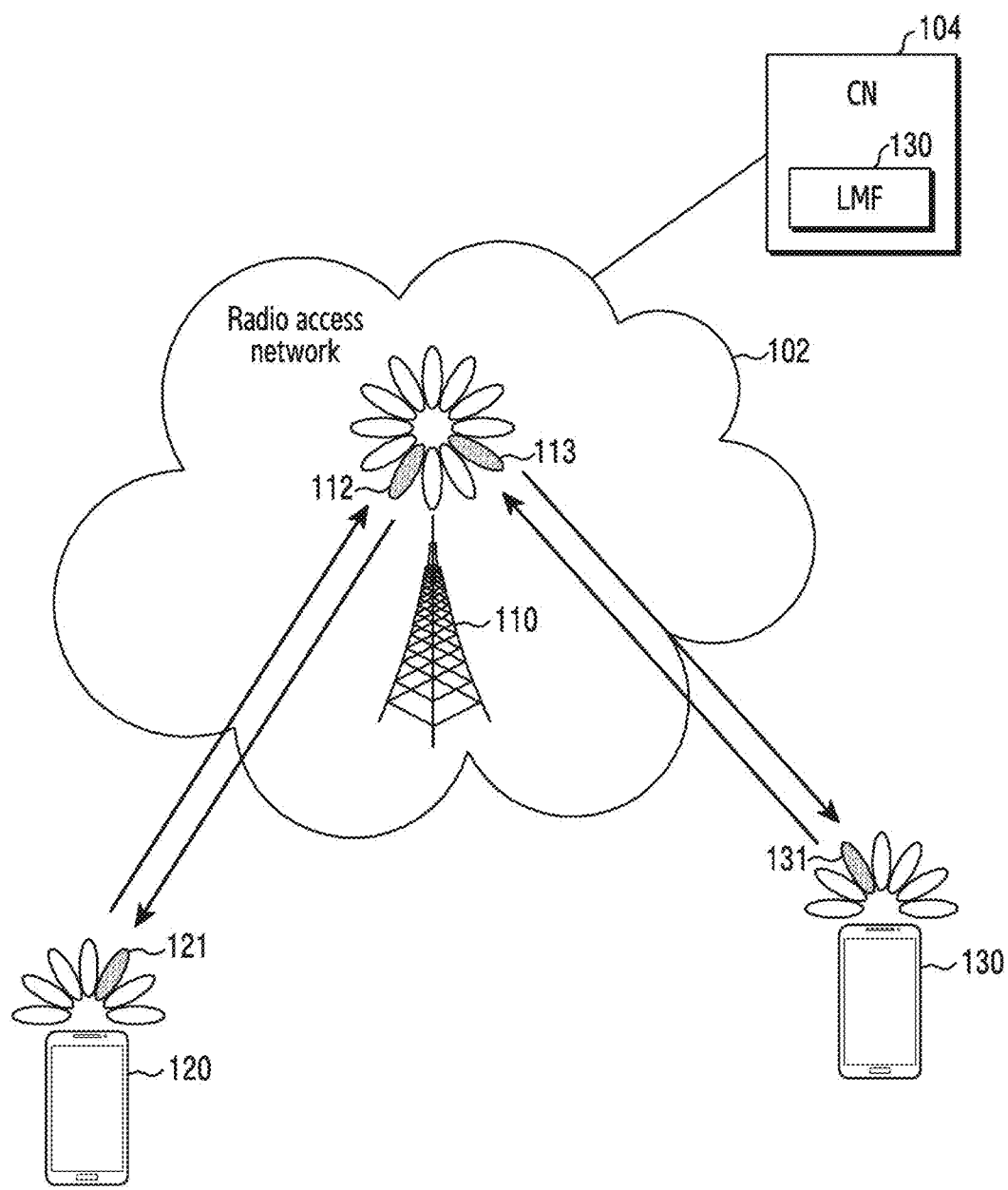
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates an apparatus and a method for localizing a terminal in a wireless communication system. Specifically, the disclosure describes a technology for localizing a terminal by means of a PRS in a wireless communication system.

Terms for identifying an access node, terms indicating network entities, terms indicating messages, terms indicating an interface between network entities, and terms indicating identification information, which are used in the following description, are exemplified for convenience of description. Accordingly, the disclosure is not limited to terms to be described later, and other terms indicating objects having the equivalent technical meaning may be used.

In addition, the disclosure describes various embodiments using terms used in some communication standards (e.g., 3rd Generation Partnership Project (3GPP)), but this is merely illustrative. Various embodiments of the disclosure may be easily modified and applied in other communication systems as well.

In particular, the disclosure is applicable to 3GPP new radio (NR), or 5th generation (5G) mobile communication standard. Further, the disclosure is applicable to intelligent services (for example, smart homes, smart buildings, smart cities, smart cars or connected cars, healthcare, digital education, retail businesses, or security and safety related services, etc.) based on a 5G communication technology and an Internet of Things (IoT)-related technology.

A wireless communication system deviates from the provision of the initial voice-oriented service and evolves into a broadband wireless communication system which provides high-speed and high-quality packet data services, for example, communication standards such as high speed packet access (HSPA), long term evolution (LTE) or evolved universal terrestrial radio access (E-UTRA), LTE-Advanced (LTE-A), and LTE-Pro of 3GPP, high rate packet data (HRPD) and an ultra mobile broadband (UMB) of 3GPP2, and 802.16e of IEEE.

An LTE system, as a representative example of a broadband wireless communication system, adopts an orthogonal frequency division multiplexing (OFDM) scheme in a downlink (DL) as a multiple-access scheme, and adopts a single carrier frequency division multiple access (SC-FDMA) scheme and/or an OFDM scheme in an uplink (UL) as a multiple-access scheme. The uplink refers to a radio link through which a terminal (e.g., user equipment (UE) or mobile station (MS)) transmits data or a control signal to a base station (e.g., eNodeB or base station (BS)). The downlink (DL) refers to a radio link through which a base station transmits data or a control signal to a terminal. In the multiple-access scheme as described above, data or control information is distinguished according to users by assigning and managing time-frequency resources for carrying data or control information for each of users, so as not to overlap each other, that is, orthogonality is established.

As a post-LTE communication system, a 5G communication system needs to freely accommodate various requirements of users and service providers, and provide services satisfying various requirements. For example, services considered for the 5G communication system may include enhanced mobile broadband (eMBB), massive machine type communication (mMTC), and ultra-reliable low-latency communication (URLLC).

According to an embodiment, the eMBB may aim to provide more enhanced data rate compared to a data rate supported by the conventional LTE, LTE-A, or LTE-Pro. For example, the eMBB in the 5G communication system needs to provide a peak data rate of 20 Gbps for a DL, and a peak data rate of 10 Gbps for an uplink, in view of a single base station. In addition to providing a peak data rate, the 5G communication system needs to provide an increased user perceived data rate of a terminal. In order to meet these requirements, the improvement of various transmission/reception technologies including more enhanced multi input multi output (MIMO) transmission technology may be required in the 5G communication system. In addition, a signal is transmitted using the maximum transmission bandwidth of 20 MHz in the 2 GHz band used by current LTE, however, the 5G communication system uses a frequency bandwidth wider than 20 MHz in the frequency band of 3-6 GHz or 6 GHz or more, and thus a data rate required in the 5G communication system may be satisfied.

In addition, in order to support application services such as Internet of Things (IoT) in the 5G communication system, mMTC is being considered. The mMTC may require large terminal access support in a cell, terminal coverage improvement, enhanced battery time, and reduced terminal cost, in order to efficiently provide the IoT. In the IoT, since the terminal is attached to various sensors and devices to provide a communication function, the IoT needs to support a large number of terminals (for example, 1,000,000 terminals/km2) in a cell. Further, since, in consideration of the characteristic of the service, the terminal supporting the mMTC is likely to be located in a shaded area where a cell cannot cover, such as the basement of a building, broader coverage may be required than other services provided by the 5G system in the mMTC. A low-cost terminal may be required for the terminal supporting the mMTC, and a very long battery lifetime of 10-15 years may be required in the mMTC, since it is difficult to frequently replace the battery of the terminal.

Finally, the URLLC is a cellular-based wireless communication service used for a mission-critical purpose, and may include services such as remote control for a robot or machinery, industrial automation, unmanned aerial vehicles, remote health care, emergency alerts. Accordingly, the communication provided by the URLLC may need to provide very low latency (ultra-low latency) and very high reliability (ultra-high reliability). For example, services supporting the URLLC may need to meet air interface latency less than 0.5 milliseconds, and also need to have a requirement of packet error rate of $10^{-5}$ or less. Therefore, for services supporting the URLLC, the 5G system may need to provide a transmit time interval (TTI) smaller than that of the other services, and a design requirement for assigning a wider resource in the frequency band to secure the reliability of the communication link may be required as well in the 5G communication system.

Three services considered in the above-described 5G communication system, i.e., eMBB, URLLC, and mMTC, may be multiplexed and provided in one system. In this case, different transmission/reception techniques and transmission/reception parameters may be used for respective services to satisfy different requirements of the respective services. However, the above-described mMTC, URLLC, and eMBB are merely examples of different types of services, and types of services which are to be applied according to the disclosure are not limited to the above-described examples.

In the following description, embodiments of the disclosure will be described by taking LTE, LTE-A, LTE-Pro or 5G (or NR, next generation mobile communication) system as an example, but embodiments of the disclosure may be applied to other communication systems having a similar technical background or channel form. In addition, embodiments of the disclosure may be applied to other communication systems through some modifications within the scope of without largely departing from the scope of the disclosure by the judgment of those skilled in the art.

FIG. 1 illustrates a wireless communication system according to various embodiments of the disclosure.

Referring to FIG. 1, a wireless communication system includes a radio access network (RAN) 102 and a core network (CN) 104.

The radio access network 102 is a network directly connected to a user device, for example, a terminal 120, and an infrastructure for providing wireless access to the terminal 120. The radio access network 102 may include a set of multiple base stations including a base station 110, and perform communication through an interface established between the multiple base stations. At least some of interfaces between the multiple base stations may be wiredly or wirelessly connected. The base station 110 may have a structure divided into a central unit (CU) and a distributed unit (DU). In this case, one central unit may control multiple distributed units. The base station 110 has a coverage defined as a predetermined geographical region based on a distance within which a signal is transmitted. The base station 110 may be referred to as an "access point (AP)", an "eNodeB (eNB)", a "5th generation (5G) node", a next generation NodeB (gNB)", a "wireless point", a transmission/reception point (TRP)", or other terms having equivalent technical meanings to those of the above-described terms, in addition to the base station.

The terminal 120 accesses the radio access network 102 and performs communication with the base station 110 through a wireless channel. In some cases, at least one of terminals 120 and 130 may be operated without a user's involvement. That is, at least one of the terminals 120 and 130 may be a device for performing machine type communication (MTC), and may not be carried by a user. Each of the terminals 120 and 130 may be referred to as a "user equipment (UE)", "a mobile station (MS)", a "subscriber station", a "remote terminal", a "wireless terminal", a "user device", or other terms having equivalent technical meanings to those of the above-described terms, in addition a terminal.

The base station 110 and the terminals 120 and 130 may transmit and receive a radio signal in a millimeter wave (mmWave) band (e.g., 28 GHz, 30 GHz, 38 GHz, or 60 GHz). In this case, in order to improve channel gain, the base station 110 and the terminals 120 and 130 may perform beamforming. Here, the beamforming may include transmission beamforming and reception beamforming. That is, the base station 110 and terminals 120 and 130 may assign directivity to a transmission signal and a reception signal. To this end, the base station 110 and terminals 120 and 130 may select serving beams 112, 113, 121, and 131 through a beam search or a beam management procedure. After the serving cells 112, 113, 121, and 131 are selected, communication may be performed through resources having a quasi colocated (QCL) relationship with the resources having been transmitted the service beams 112, 113, 121, and 131.

A first antenna port and a second antenna port may be considered to be in the QCL relationship when large-scale properties of a channel through which a symbol on the first antenna port is transmitted can be inferred from a channel through which a symbol on the second antenna port is transmitted. For example, the large-scale properties may include at least one of delay spread, Doppler spread, Doppler shift, average gain, average delay, and a spatial receiver parameter.

In the disclosure, an eNB may be used interchangeably with a gNB for the convenience of explanation. That is, the base station described as the eNB may refer to the gNB. In addition, the term, "terminal", may also indicate other wireless communication devices as well as a mobile phone, narrow band (NB)-IoT devices, and sensors.

The central network 104 is a network for managing the entire system, controls the radio access network 102, and processes data and control signals for the terminal 102, transmitted or received through the radio access network 102. The central network 104 performs various functions such as user plane and control plane control, mobility processing, subscriber information management, billing, and interworking with other types of systems (e.g., a long term evolution (LTE) system). In order to perform the above-described functions, the central network 104 may include functionally divided multiple entities having different network functions (NFs). For example, the central network 104 may include a location management function (LMF) 130. The LMF 130 may perform functions for localizing the terminal (e.g., the terminal 120 and/or 130) in the wireless communication system.

Figure 2:
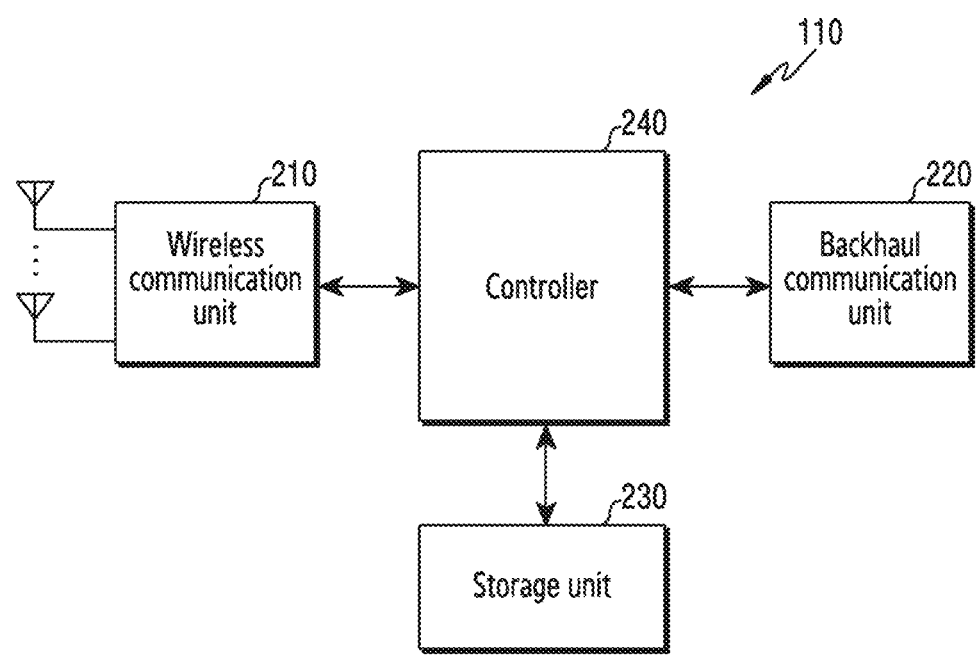
FIG. 2 illustrates a configuration of a base station in a wireless communication system according to various embodiments of the disclosure.

FIG. 2 illustrates a configuration of a base station in a wireless communication system according to various embodiments of the disclosure. The configuration exemplified in FIG. 2 may be understood as a configuration of the base station 110. The term "unit", "-or/er", or the like, to be used later may indicate a unit for processing at least one function or operation, and can be implemented by hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bitstream according to a physical layer standard of the system. For example, when transmitting data, the wireless communication unit 210 encodes and modulates a transmission bitstream to generate complex symbols. In addition, when receiving data, the wireless communication unit 210 demodulates and decodes a baseband signal to restore a reception bitstream.

Further, the wireless communication unit 210 up-converts a baseband signal into a radio frequency (RF) band signal and then transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. The wireless communication unit 210 may also include multiple transmission/reception paths. Furthermore, the wireless communication unit 210 may include at least one antenna array including multiple antenna elements.

In terms of hardware, the wireless communication unit 210 may include a digital unit and an analog unit. The analog unit may include multiple sub-units according to operating power, operating frequency, and the like. The digital unit may be implemented by at least one processor (e.g., a digital signal processor (DSP)).

As described above, the wireless communication unit 210 transmits and receives a signal. Accordingly, some or entirety of the wireless communication unit 210 may be referred to as a "transmitter", a "receiver", or a "transceiver". In addition, in the following description, transmission and reception performed through a wireless channel are used to have a meaning including the processing performed by the wireless communication unit 210 as described above.

The backhaul communication unit 220 provides an interface for performing communication with other nodes in the network. That is, the backhaul communication unit 220 converts a bitstream transmitted from the base station to another node, for example, another access node, another base station, a higher node, a core network, or the like, into a physical signal, and converts a physical signal received from another node into a bitstream.

The storage unit 230 stores a basic program for operating a base station, an application program, and data such as configuration information. The storage unit 230 may include a volatile memory, a nonvolatile memory, and a combination of the volatile memory and the nonvolatile memory. The storage unit 230 provides data stored according to a request from the controller 240.

The controller 240 controls overall operations of the base station. For example, the controller 240 transmits and receives a signal through the wireless communication unit 210 or the backhaul communication unit 220. In addition, the controller 240 records data in the storage unit 230 and reads the recorded data therefrom. The controller 240 may perform functions of a protocol stack required by the communication standard. According to another embodiment, the protocol stack may be included in the wireless communication unit 210. To this end, the controller 240 may include at least one processor.

According to various embodiments, the controller 240 may control the base station to perform operations according to various embodiments to be described later.

Figure 3:
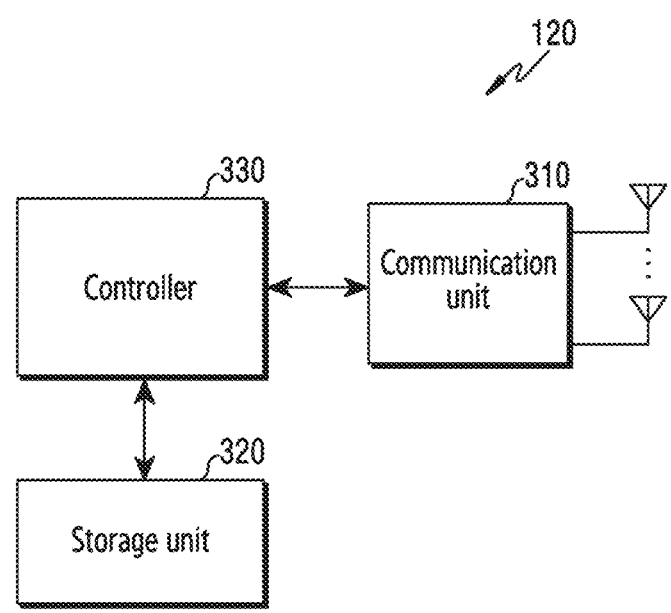
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration exemplified in FIG. 3 may be understood as a configuration of the terminal 120. The term "unit", "-or/er", or the like, to be used later may indicate a unit for processing at least one function or operation, and can be implemented by hardware, software, or a combination thereof.

Referring to FIG. 3, the terminal includes a communication unit 310, a storage unit 320, and a controller 330.

The communication unit 310 performs functions for transmitting or receiving a signal through a wireless channel. For example, the communication unit 310 performs a function of conversion between a baseband signal and a bitstream according to a physical layer standard of the system. For example, when transmitting data, the communication unit 310 encodes and modulates a transmission bitstream to generate complex symbols. In addition, when receiving data, the communication unit 310 demodulates and decodes a baseband signal to restore a reception bitstream. In addition, the communication unit 310 up-converts a baseband signal into an RF base signal and then transmits the RF band signal through an antenna, and down-converts an RF base signal received through an antenna into a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Furthermore, the communication unit 310 may include at least one antenna array including multiple antenna elements. In terms of hardware, the communication unit 310 may include a digital circuit and an analog circuit (e.g., a radio frequency integrated circuit (RFIC)). Here, the digital circuit and the analog circuit may be implemented by one package. The communication unit 310 may also include multiple RF chains. Moreover, the communication unit 310 may perform beamforming.

As described above, the communication unit 310 transmits and receives a signal. Accordingly, some or entirety of the communication unit 310 may be referred to as a "transmitter", a "receiver", or a "transceiver". In addition, in the following description, transmission and reception performed through a wireless channel are used to have a meaning including the processing performed by the communication unit 310 as described above.

The storage unit 320 stores a basic program for operating the terminal, an application program, and data such as configuration information. The storage unit 320 may include a volatile memory, a nonvolatile memory, and a combination of the volatile memory and the nonvolatile memory. The storage unit 320 provides data stored according to a request from the controller 330.

The controller 330 controls overall operations of the terminal. For example, the controller 330 transmits and receives a signal through the communication unit 310. In addition, the controller 330 records data in the storage unit 320 and reads the recorded data therefrom. The controller 330 may perform functions of a protocol stack required by the communication standard. To this end, the controller 330 may include at least one processor or a micro-processor, or may be a part of a processor. Further, a part of the communication unit 310 and the controller 330 may be referred to as a communication processor (CP).

According to various embodiments, the controller 330 may control the terminal to perform operations according to various embodiments to be described later.

Figure 4A:
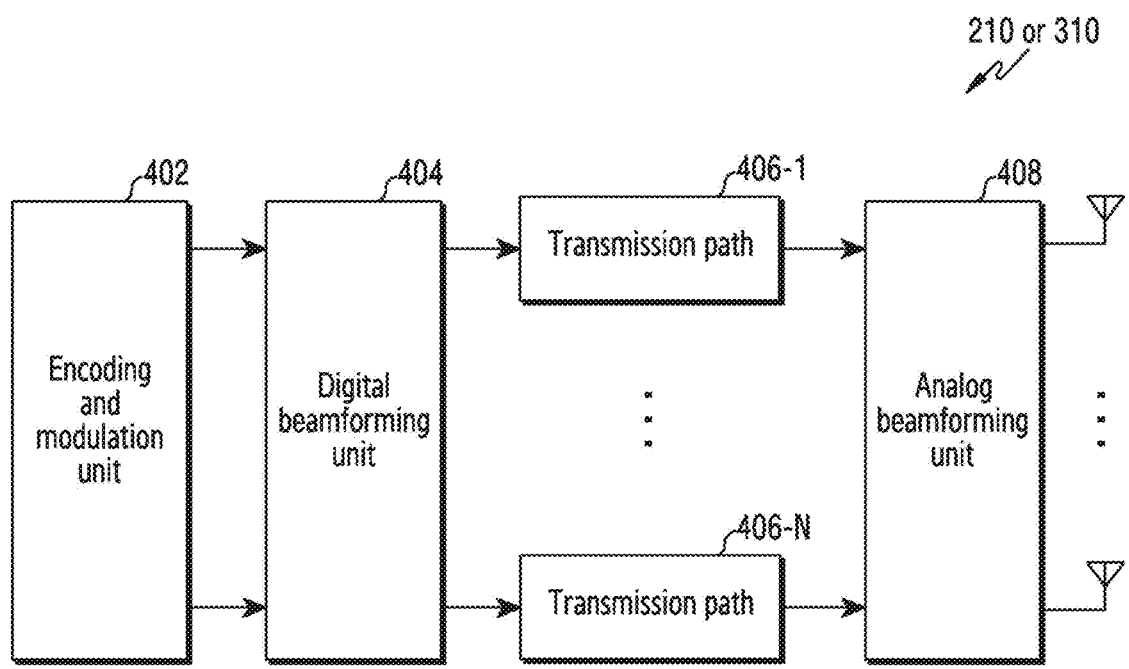
FIGS. 4A to 4C illustrate a configuration of a communication unit in a wireless communication system according to various embodiments of the disclosure.
Figure 4B:
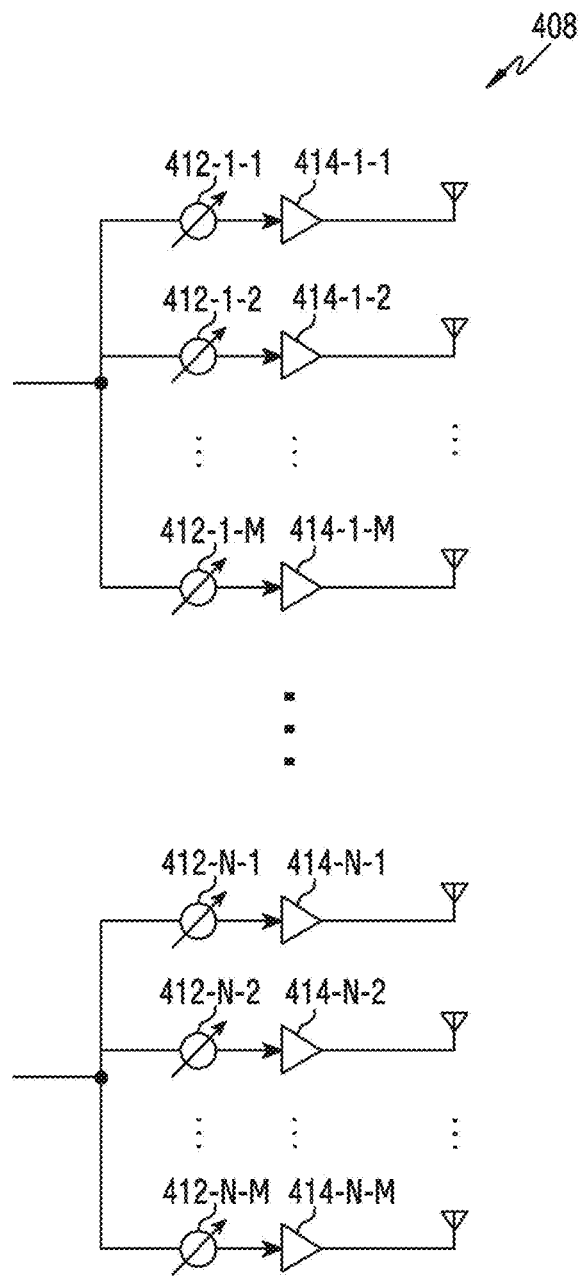
Figure 4C:
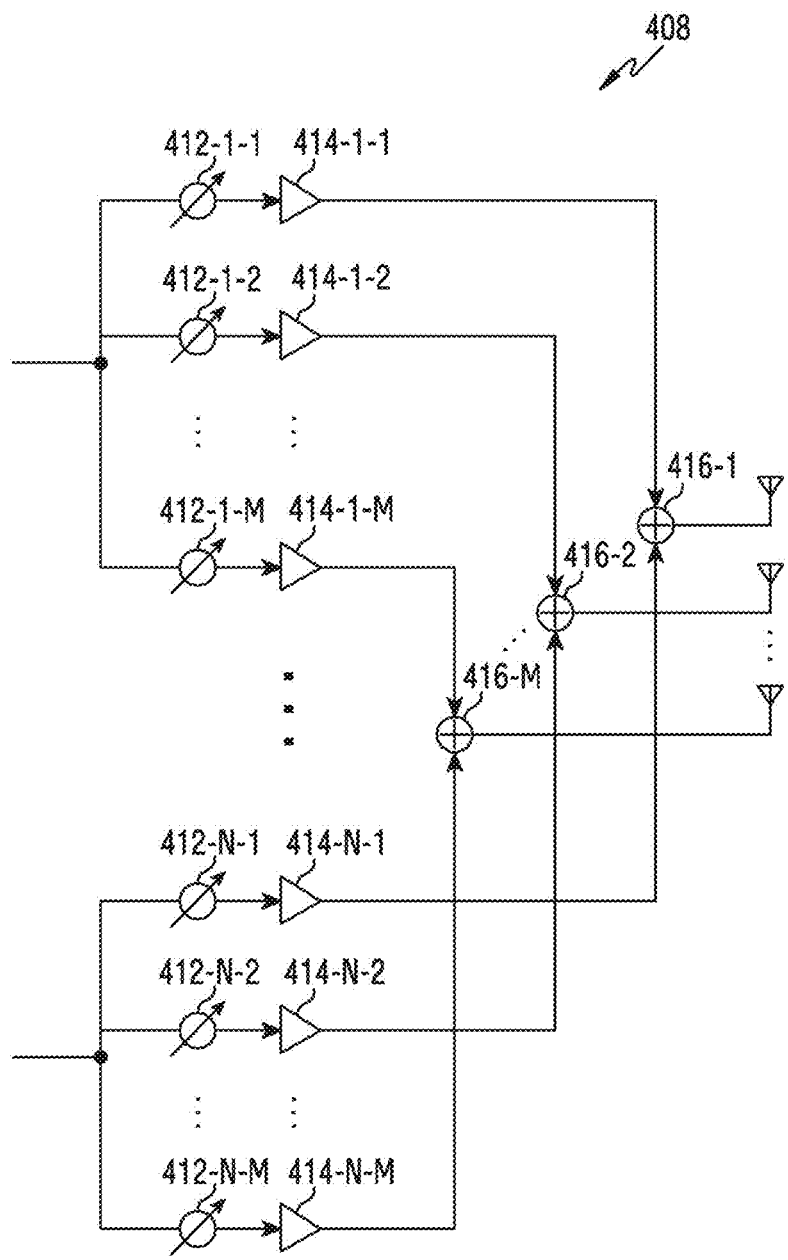

FIGS. 4A to 4C illustrate a configuration of a communication unit in a wireless communication system according to various embodiments of the disclosure. FIGS. 4A to 4C illustrate an example of a configuration of the wireless communication unit 210 of FIG. 2 and the communication unit 310 of FIG. 3 in detail according to various embodiments of the disclosure. Specifically, FIGS. 4A to 4C exemplify elements for performing beamforming as a part of the wireless communication unit 210 of FIG. 2 or the communication 310 of FIG. 3.

Referring to FIG. 4A, the wireless communication unit 210 or the communication unit 310 includes an encoding and modulation unit 402, a digital beamforming unit 404, multiple transmission paths 406-1 to 406-N, and an analog beamforming unit 408.

The encoding and modulation unit 402 performs channel encoding. For the channel encoding, at least one of a low density parity check (LDPC) code, a convolution code, and a polar code may be used. The encoding and modulation unit 402 performs constellation mapping to generate complex symbols.

The digital beamforming unit 404 performs beamforming on a digital signal (e.g., complex symbols). To this end, the digital beamforming unit 404 multiplies the modulated symbols by beamforming weights. Here, the beamforming weights are used to change the magnitude or the phase of a signal, and may be referred to as a "precoding matrix", a "precoder", and the like. The digital beamforming unit 404 outputs the modulated symbols having gone through the digital beamforming to the multiple transmission paths 406-1 to 406-N. In this case, according to a multiple-input multiple-output (MIMO) transmission technique, the modulated symbols may be multiplexed, or the same modulated symbols may be provided to the multiple transmission paths 406-1 to 406-N.

The multiple transmission paths 406-1 to 406-N convert the digital signals having gone through the digital beamforming into analog signals. To this end, each of the multiple transmission paths 406-1 to 406-N may include an inverse fast Fourier transform (IFFT) calculator, a cyclic prefix (CP) inserter, a DAC, and an up-converter. The CP inserter may be used for an orthogonal frequency division multiplexing (OFDM) scheme, and may be excluded when another physical layer scheme (e.g., a filter bank multi-carrier (FBMC)) is applied. That is, the multiple transmission paths 406-1 to 406-N provide an independent signal processing process with respect to multiple streams generated by the digital beamforming. However, according to an implementation method, a part of elements of the multiple transmission paths 406-1 to 406-N may be shared.

The analog beamforming unit 408 performs beamforming on an analog signal. To this end, the digital beamforming unit 404 multiplies analog signals by beamforming weights. Here, the beamforming weights are used to change the magnitude and the phase of a signal. Specifically, according to a connection structure between the multiple transmission paths 406-1 to 406-N and antennas, the analog beamforming unit 408 may be configured as illustrated in FIGS. 4B to 4C.

Referring to FIG. 4B, signals input to the analog beamforming unit 408 pass through phase/magnitude conversion calculation and amplification calculation and are transmitted through antennas. In this case, the signal of each of the paths is transmitted through different antenna sets, i.e., antenna arrays. In case of processing a signal input through a first path, the signal is converted into a signal sequence having different or the same phase/magnitude by phase/magnitude converters 412-1-1 to 412-1-M, the signal sequence is amplified by amplifiers 414-1-1 to 414-1-M, and then the amplified signal sequence is transmitted through an antenna.

Referring to FIG. 4C, signals input to the analog beamforming unit 408 pass through phase/magnitude conversion calculation and amplification conversion calculation, and are transmitted through antennas. In this case, the signal of each of the paths is transmitted through the same antenna set, i.e., an antenna array. In case of processing a signal input through a first path, the signal is converted into a signal sequence having different or the same phase/magnitude by phase/magnitude converters 412-1-1 to 412-1-M, and the signal sequence is amplified by amplifiers 414-1-1 to 414-1-M. The amplified signals are added by adders 416-1-1 to 416-1-M with reference to an antenna element, and then transmitted through antennas, so as to be transmitted through one antenna array.

FIG. 4B illustrates an example of using an independent antenna array for each transmission path, and FIG. 4C illustrates an example of sharing one antenna array by transmission paths. However, according to another embodiment, some transmission paths may use independent antenna arrays and the remaining transmission paths may share one antenna array. Further, according to still another embodiment, a switchable structure may be applied between transmission paths and antenna arrays, so that a structure adaptively changeable according to the circumstances may be used.

Figure 5:
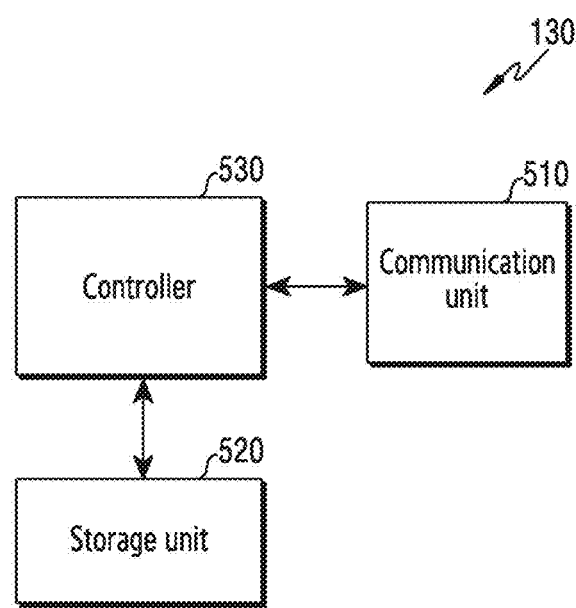
FIG. 5 illustrates a configuration of an LMF device in a wireless communication system according to various embodiments of the disclosure.

FIG. 5 illustrates a configuration of an LMF device in a wireless communication system according to various embodiments of the disclosure. The configuration exemplified in FIG. 5 may be understood as a configuration of an LMF device that is a device having a function of the LMF 130 of FIG. 1. Hereinafter, the term "unit", "-or/er", or the like, to be described later may indicate a unit for processing at least one function or operation, and can be implemented by hardware, software, or a combination thereof.

Referring to FIG. 5, the LMF device includes a communication unit 510, a storage unit 520, and a controller 530.

The communication unit 510 provides an interface for performing communication with another device in the network. The communication unit 510 may convert a bitstream transmitted from the LMF device to another device into a physical signal, and convert a physical signal received from another device into a bitstream. That is, the communication unit 510 may transmit and receive a signal. Accordingly, the communication unit 510 may be referred to as a modem, a transmitter, a receiver, or a transceiver. Here, the communication unit 510 enables the LMF device to communicate with other devices or another system through a backhaul connection (e.g., a wired backhaul or a wireless backhaul) or a network.

The storage unit 520 stores a basic program for operating an LMF device, an application program, and data such as configuration information. The storage unit 520 may include a volatile memory, a nonvolatile memory, or a combination of the volatile memory and the nonvolatile memory. In addition, the storage unit 520 provides data stored according to a request from the controller 530.

The controller 530 controls overall operations of the LMF device. For example, the controller 530 transmits or receives a signal through the communication unit 510. Further, the controller 530 records data in the storage unit 520 and reads the recorded data therefrom. To this end, the controller 530 may include at least one processor.

According to various embodiments, the controller 530 may control the LMF device to perform operations according to various embodiments to be described later.

Figure 6:
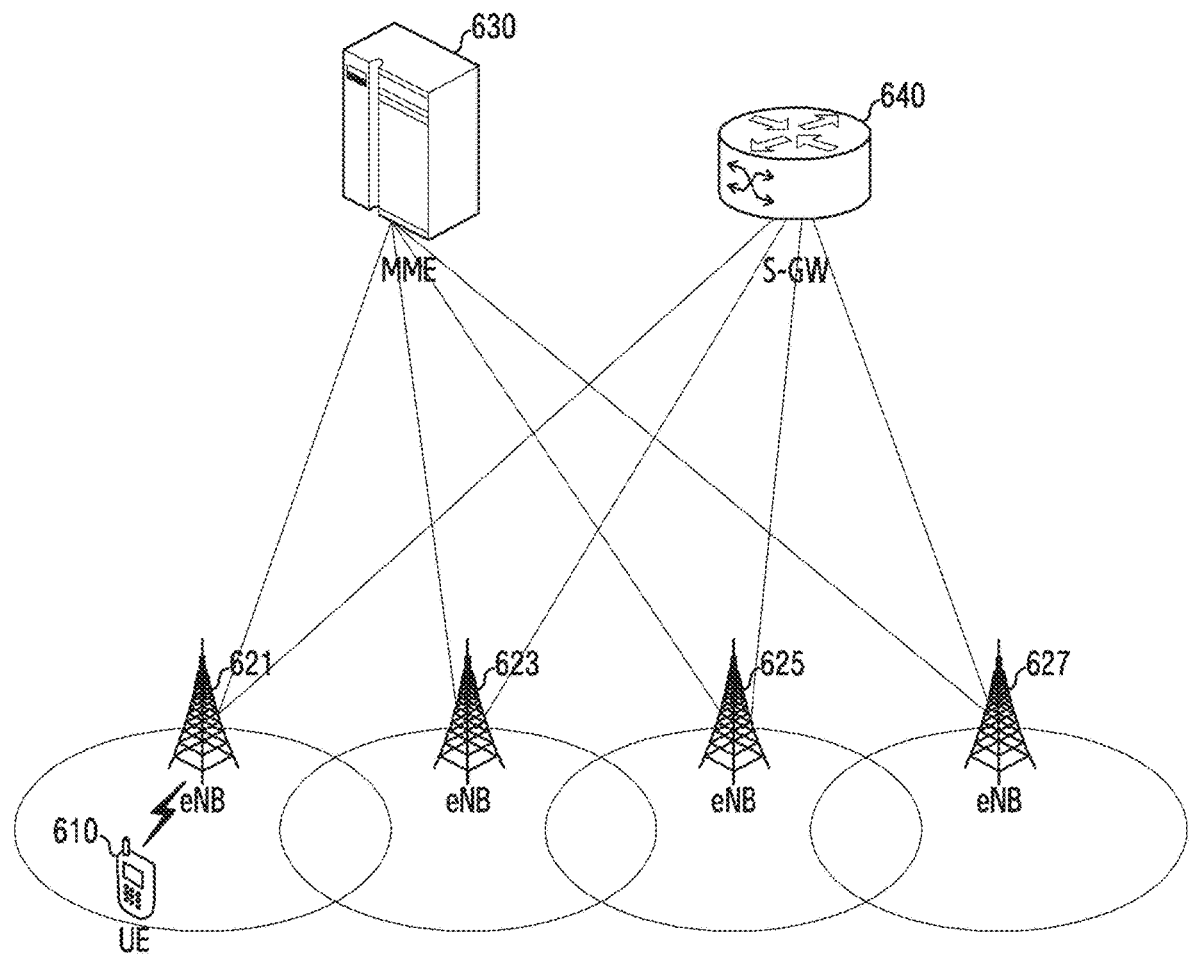
FIG. 6 illustrates an example of a structure of a wireless communication system according to various embodiments of the disclosure.

FIG. 6 illustrates an example of a structure of a wireless communication system according to various embodiments of the disclosure. The wireless communication system exemplified in FIG. 6 may be an LTE system.

Referring to FIG. 6, a radio access network of the LTE system may include eNBs 621, 623, 625, and 627, a mobility management entity (MME) 630, and a serving gateway (S-GW) 640. A UE 610 may access an external network through at least one of the eNBs 621, 623, 625, and 627 and the S-GW 640.

In FIG. 6, the eNBs 621, 623, 625 and 627 may correspond to node Bs of a universal mobile telecommunication system (UMTS). The eNB 621 may be connected to the UE 610 through a wireless channel, and perform more complex functions compared to the node B. In the LTE system, all the user traffic services including real time services such as a voice over internet protocol (VoIP) through an internet protocol may be provided through a shared channel. Therefore, a device for performing scheduling based on state information such as a buffer state, a power headroom state, and a channel state of the UEs may be required, and the device may be the eNBs 621, 623, 625, and 627. One eNB (e.g., the eNB 621) may control multiple cells. For example, in order to implement a data rate of 100 Mbps, the LTE system may employ an OFDM as a wireless access technology, for example, in a bandwidth of 20 MHz. In addition, the eNB (e.g., the eNB 621) may employ an adaptive modulation & coding (AMC) scheme by which a modulation scheme and a channel coding rate are determined based on a channel state of a terminal. The S-GW 640 is a device for providing a data bearer, and may generate or remove a data bearer under control of the MME 630. The MME 630 is a device being responsible for a mobility management function and various control functions for a terminal (e.g., the UE 610), and may be connected to multiple base stations (e.g., eNBs 621, 623, 625, and 627).

Figure 7:
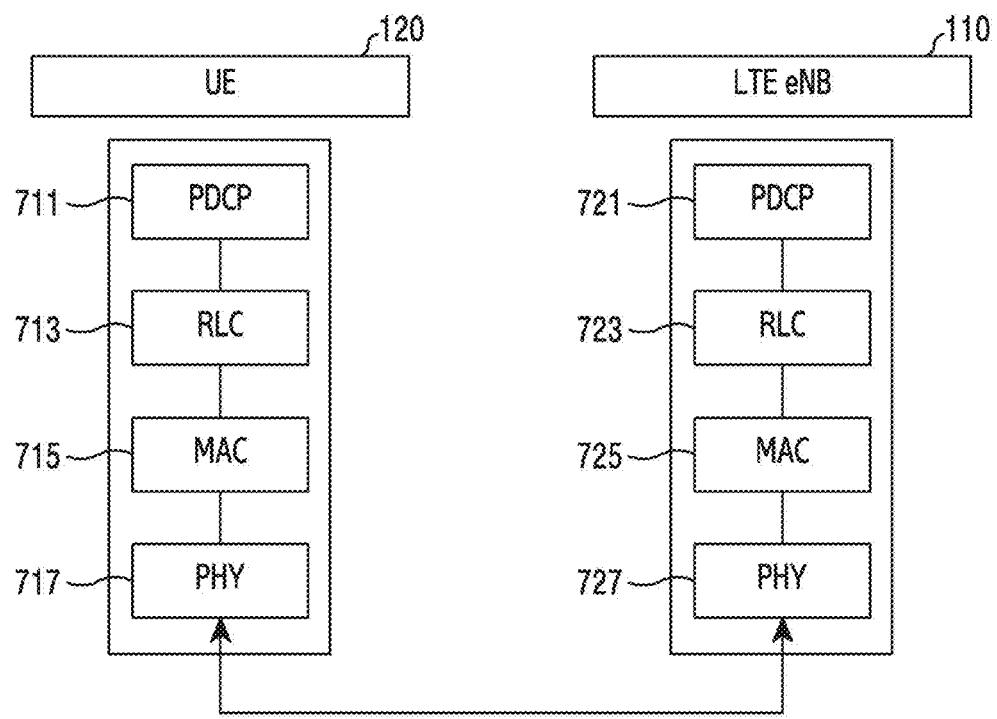
FIG. 7 illustrates an example of a wireless protocol structure in a wireless communication system according to various embodiments of the disclosure.

FIG. 7 illustrates an example of a wireless protocol structure in a wireless communication system according to various embodiments of the disclosure. The wireless communication system exemplified in FIG. 7 may be an LTE system.

Referring to FIG. 7, wireless protocols in the LTE system may include, in the UE 120 and the eNB 110, packet data convergence protocols (PDCPs) 711 and 721, radio link controls (RLCs) 713 and 723, medium access controls (MACs) 715 and 725, and physical layers (PHYs) 717 and 727, respectively. The PDCPs 711 and 721 may perform an operation such as IP header compression or decompression. Main functions of the PDCPs 711 and 721 may include at least one of the following examples, but are not limited thereto:

Header compression and decompression (ROHC)
Transfer of user data
In-sequence delivery of upper layer PDUs at PDCP re-establishment procedure for RLC AM
For split bearers in dual connectivity (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

According to an embodiment, the RLCs 713 and 723 may reconfigure a PDCP packet data unit (PDU) to have an appropriate size and perform operations such as an automatic repeat request (ARQ). Main functions of the RLCs 713 and 723 may include at least one of the following examples, but are not limited thereto:

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment According to an embodiment, the MACs 715 and 725 may be connected with various RLC layer devices arranged in the UE 120, multiplex RLC PDUs into MAC PDUs, and demultiplex RLC PDUs from MAC PDUs. Main functions of the MACs 715 and 717 may include at least one of the following examples, but are not limited thereto:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding According to an embodiment, the PHYs 717 and 727 may perform channel coding and modulation for higher layer data, convert the higher layer data into an OFDM symbol, and transmit the OFDM symbol to a wireless channel, or may perform demodulation and channel decoding for an OFDM symbol received through a wireless channel and transmit same to a higher layer.

Figure 8:
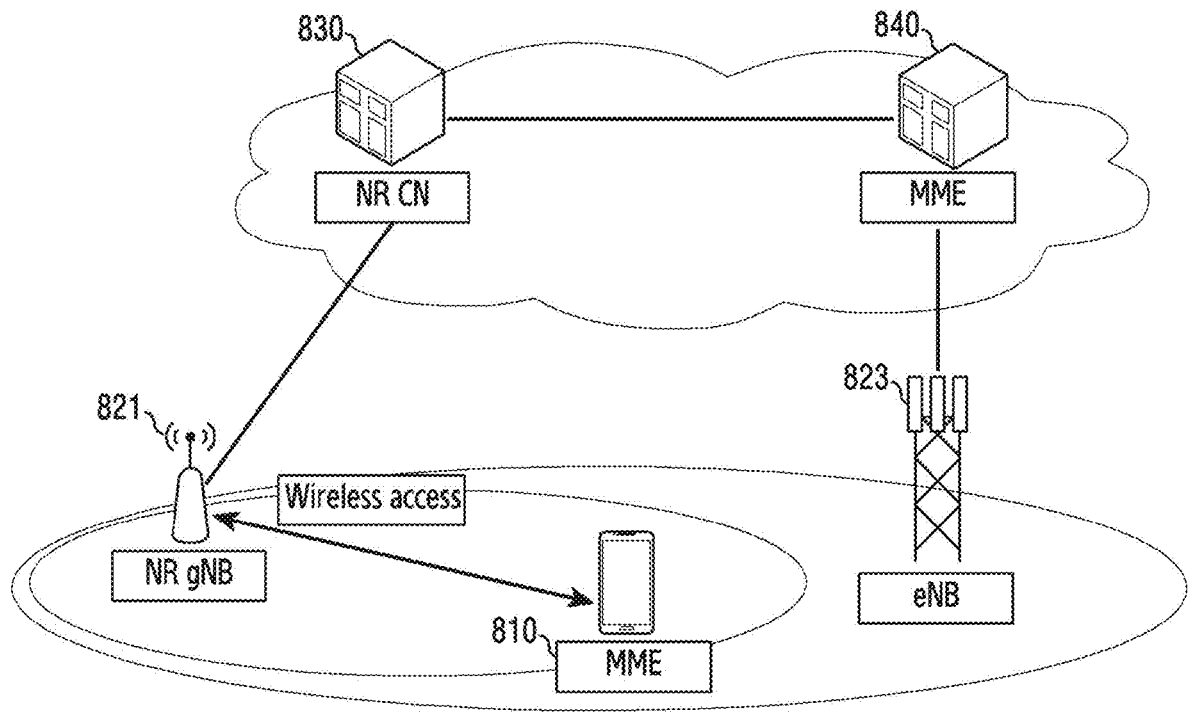
FIG. 8 illustrates another example of a structure of a wireless communication system according to various embodiments of the disclosure.

FIG. 8 illustrates another example of a structure of a wireless communication system according to various embodiments of the disclosure. The wireless communication system exemplified in FIG. 8 may be an NR system.

Referring to FIG. 8, a radio access network of the NR system may include an NR gNB 821 and an NR core network (CN) 830. The NR UE 810 (e.g., the terminal 120) may access an external network through the NR gNB 821 and the NR CN 830.

In FIG. 8, the NR gNB 821 may correspond to the eNB of the LTE system. The NR gNB 821 may be connected to the NR UE 810 through a wireless channel, and provide services superior to those of the node B and/or the eNB. In the NR system, all the user traffic services may be provided through a shared channel. Therefore, a device for performing scheduling based on state information such as a buffer state, a power headroom state, and a channel state of the UEs, and the device may be the NR gNB 821. The NR gNB 821 may control multiple cells. In the NR system, in order to implement an ultra-high data rate compared to the LTE system, a bandwidth, which is equal to or greater than the maximum bandwidth supported in the LTE system, may be applied. In addition, the NR system may employ, as a wireless access technology, an OFDM and further employ a beamforming technology.

According to an embodiment, the NR gNB 821 may employ an AMC scheme by which a modulation scheme and a channel coding rate are determined based on a channel state of the UE 810. The NR CN 830 may perform functions such as mobility support, bearer configuration, and quality of service (QoS) configuration. The NR CN 821 may perform a mobility management function and various control functions for the UE 810, and may be connected to multiple base stations.

According to various embodiments, the NR system may interwork with the LTE system. In this case, the NR CN 830 may be connected to the MME 840 through a network interface. The MME 840 may be connected to the eNB 823, which is the base station in the LTE system.

Figure 9:
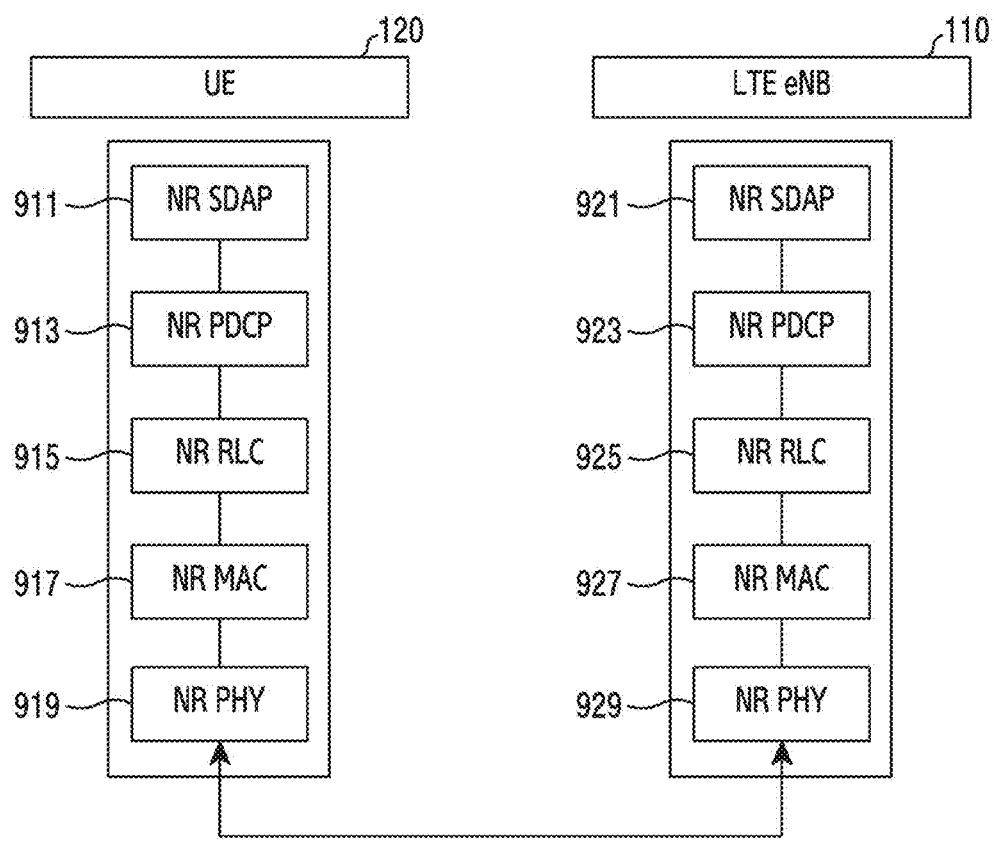
FIG. 9 illustrates still another example of a wireless protocol structure in a wireless communication system according various embodiments of the disclosure.

FIG. 9 illustrates another example of a wireless protocol structure in a wireless communication system according to various embodiments of the disclosure. The wireless communication system exemplified in FIG. 9 may be an NR system.

Referring to FIG. 9, wireless protocols in the NR system may include, in the UE (e.g., the terminal 120) and the NR eNB (e.g., the base station 110), NR service data adaption protocols (SDAPs) 911 and 921, NR PDCPs 913 and 923, NR RLCs 915 and 925, NR MACs 917 and 927, and NR PHYs 919 and 929, respectively.

According to an embodiment, main functions of the NR SDAPs 911 and 921 may include at least one of the following examples, but are not limited thereto:

Transfer of user plane data

Mapping between a QoS flow and a DRB for both DL and UL

Marking QoS flow ID in both DL and UL packets

Reflective QoS flow to DRB mapping for the UL SDAP PDUs

With respect to a SDAP layer device, the terminal 120 may be configured whether to use a header of the SDAP layer device, or whether to use a function of the SDAP layer device, according to PDCP layer devices, bearers, or logical channels, through a radio resource control (RRC). In addition, when an SDAP header is configured, the SDAP layer device may direct the terminal 120 to update or reconfigure uplink and downlink quality of service (QoS) flow and data bearer mapping information by means of a 1-bit non-access stratum (NAS) reflective QoS indicator and a 1-bit access stratum (AS) reflective QoS indicator of the SDAP header. According to an embodiment, the SDAP header may include QoS flow ID information indicating QoS. According to an embodiment, QoS information may function as the same as or similar to data processing priority information or scheduling information to appropriately support a service.

According to an embodiment, main functions of the NR PDCPs 913 and 923 may include at least one of the following examples, but are not limited thereto:

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above-described functions of the NR PDCPs 913 and 923, the reordering may indicate a function of reordering, based on a PDCP sequence number (SN), PDCP PDUs received from a lower layer. The reordering by the NR PDCP device may include functions of: delivering the reordered data to a higher layer in order; delivering without considering the order; reordering and recording missing PDCP PDUs; reporting a state on the missing PDCP PDUs to a transmitter; and requesting retransmission of the missing PDCP PDUs.

According to an embodiment, main functions of the NR RLC 915 and 925 may include at least one of the following examples, and are not limited thereto:

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above-described functions of the NR RLC 915 and 925, the in-sequence delivery may indicate a function of delivering RLC SDUs received from a lower layer, to a higher layer in order. When one RLC SDU is received after being segmented into multiple RLC SDUs, the in-sequence delivery function of the NR RLC device may include a function of reassembling the multiple RLC SDUs obtained by segmenting the RLC SDU, and delivering the reassembled RLC SDUs, to a higher layer.

The in-sequence delivery by the NR RLC device may include functions of: reordering the received RLC PDUs according to an RLC sequence number (SN) or a PDCP sequence number (SN); reordering and recording missing RLC PDUs; reporting a state on the missing RLC PDUs to a transmitter; and requesting retransmission of the missing RLC PDUs.

When a missing RLC SDU exists, the in-sequence delivery of the NR RLC device may include a function of delivering only RLC SDUs prior to the missing RLC SDU, to a higher layer in order.

When a missing RLC SDU exists but a predetermined timer is expired, the in-sequence delivery of the NR RLC may include a function of delivering all RLC SDUs received before the timer starts, to a higher layer in order.

When a missing RLC SDU exists but a predetermined timer is expired, the in-sequence delivery of the NR RLC device may include a function of delivering all RLC SDUs received up to a current time, to a higher layer in order.

The NR RLC device may process the RLC PDUs in order of reception, regardless of sequence number order (out-of sequence delivery), and deliver the processed RLC PDUs to the NR PDCP device.

When the NR RLC device receives a segment, the NR RLC device may receive segments, which are stored in a buffer or are to be subsequently received, reconfigure the segments into one complete RLC PDU, and deliver the RLC PDU to the NR PDCP device.

The NR RLCs 915 and 925 may not perform concatenation. In this case, the NR MACs 917 and 927 instead may perform the concatenation, or the concatenation by the NR MACs 915 and 925 may be replaced with multiplexing.

In the above-described functions of the NR RLCs 915 and 925, the out-of-sequence delivery by the NR RLC device may indicate a function of delivering RLC SDUs received from a lower layer, to a higher layer out of order. When one RLC SDU is received after being segmented into multiple RLC SDUs, the out-of-order delivery by the NR RLC device may include a function of reassembling the multiple RLC SDUs obtained by segmenting the RLC SDU, and delivering the reassembled RLC SDU to a higher layer. The out-of-sequence delivery by the NR RLC device may include a function of storing and reordering RLC SNs or PDCP SNs of the received RLC PDUs and recording missing RLC PDUs.

According to an embodiment, the NR MACs 917 and 927 may be connected to multiple NR RLC layer devices included in the terminal 120. Main functions of the NR MACs 917 and 927 may include at least one of the following examples, but are not limited thereto:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHYs 919 and 929 may perform channel coding and modulation for higher layer data, convert the higher layer data into an OFDM symbol, and transmit the OFDM symbol to a wireless channel, or may perform demodulation and channel decoding for an OFDM symbol received through a wireless channel and transmit same to a higher layer.

Figure 10:
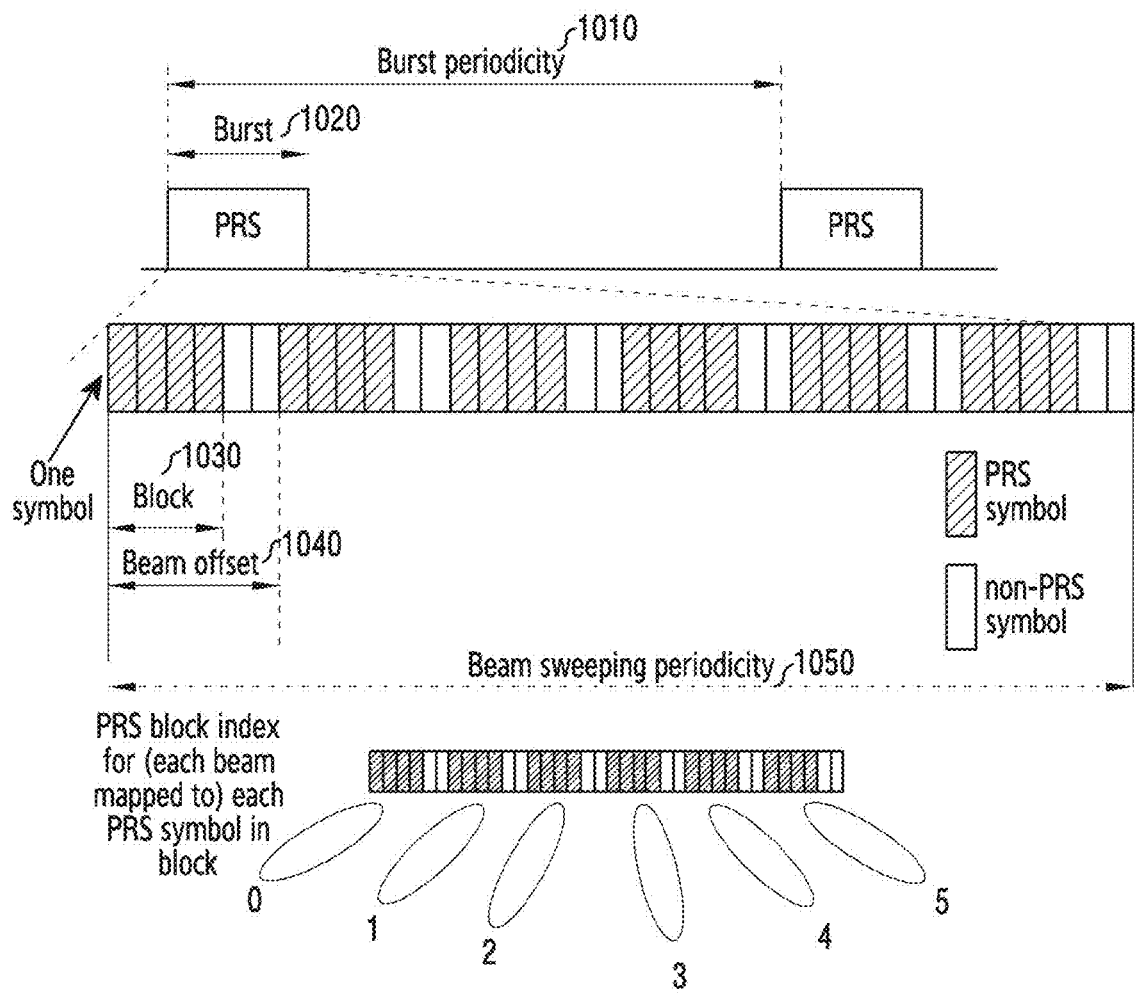
FIG. 10 illustrates a structure of a positioning reference signal (PRS) transmitted from a cell of a base station in a wireless communication system according various embodiments of the disclosure.

FIG. 10 illustrates a structure of a positioning reference signal (PRS) transmitted from a cell of a base station in a wireless communication system according to various embodiments of the disclosure.

Referring to FIG. 10, each symbol may indicate an OFDM symbol. A length of the OFDM symbol in a time axis may be defined according to subcarrier spacing (SCS) in an operating frequency domain, and a width of a frequency domain of an OFDM symbol may be also determined according to the SCS. A PRS symbol may be a reference signal configured for positioning. According to various embodiments, the PRS may include at least one of a primary synchronization signal (PSS), a secondary synchronization signal (SSS), a synchronization signal block (SSB), a channel state information-reference signal (CSI-RS), or a demodulation reference signal (DRMS). Here, the SSB may include the PSS, the SSS, and a physical broadcast channel (PBCH), and may be referred to as an SS/PBCH block.

According to various embodiments, a PRS block 1030 may indicate a set of PRS symbols continuous in time. The PRS block 1030 may be spaced apart from the subsequent PRS block by a predetermined number of symbols. A timing difference in a symbol unit between an initial symbol (or a first symbol) of the PRS block 1030 and an initial symbol (or a first symbol) of the subsequent PRS block may be referred to as a PRS beam offset 1040.

According to various embodiments, a PRS burst 1020 may include a set of a predetermined number of PRS blocks. A time interval between start time of the PRS burst 1020 and start time of the subsequent PRS burst may be referred to as a PRS burst periodicity 1010. In addition, a time interval obtained by concatenating, with each other, as many pairs of a PRS block and a PRS beam offset adjacent to the PRS block as PRS blocks included in the PRS burst 1020 may be referred to as a PRS beam sweeping periodicity 1050.

One PRS block may be mapped to one beam in a cell and transmitted. A PRS block index may be assigned to a PRS block, applied the same to each PRS symbol included in the assigned PRS block, and transmitted through the PRS symbol. During the PRS beam sweeping periodicity 1050, symbols of each PRS block may be mapped into one beam, and sequentially transmitted. Temporally, no beam may be transmitted during the PRS beam offset (e.g., the PRS beam offset 1040). The above-described information (e.g., the PRS burst periodicity, the PRS beam offset, the PRS beam sweeping periodicity, the size of the PRS block, or the number of PRS symbols in the PRS block, the beam-specific index or the PRS block index transmitted in the beam sweeping periodicity, the type of the reference signal included in the PRS (e.g., the type of the reference signal including at least one of SSB, CSI-RS, CRS, or DM-RS), the temporal width of the symbol, and/or the subcarrier spacing of the symbol) may be information required for transmission of a PRS in a cell, and may be given to a location management function (LMF) (e.g., a location management server) and a terminal.

Figure 11:
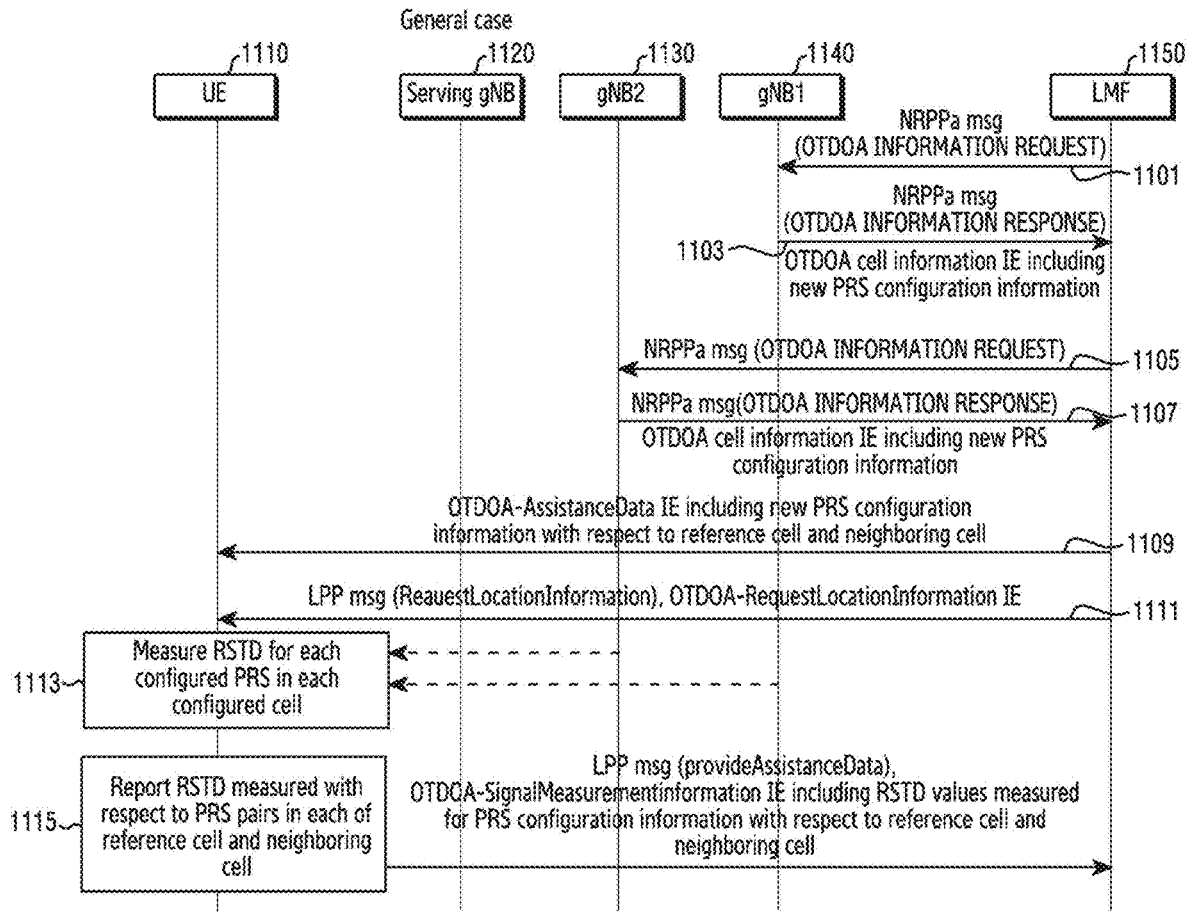
FIG. 11 illustrates a signal flow for localizing a terminal in a wireless communication system according various embodiments of the disclosure.

FIG. 11 illustrates a signal flow for localizing a terminal in a wireless communication system according to various embodiments of the disclosure. In an example of FIG. 11, a UE 1110 (e.g., the terminal 120) and a serving cell of a serving gNB 1120 (e.g., the base station 110) may be in a connected state (e.g., RRC_CONNECTED state). An LMF 1150 may identify that the UE 1110 accesses the serving gNB 1120, and neighboring cells of the serving gNB 1120 are provided by a gNB2 1130 and a gNB1 1140.

Referring to FIG. 11, in operation 1101, the LMF 1150 may send an observed time difference of arrival (OTDOA) INFORMATION REQUEST message of an NR positioning protocol A (NRPPa) protocol, to the gNB1 1140. For example, the LMF 1150 may request OTDOA-related cell-specific information from the gNB1 1140 through the OTDOA INFORMATION REQUEST message.

In operation 1103, the gNB1 1140 may send an OTDOA INFORMATION RESPONSE message of an NRPPa protocol, to the LMF 1150. The gNB1 1140 having received the request for the OTDOA-related information may transmit OTDOA PRS information to the LMF 1150 through an information element (IE) of OTDOA cell information of the OTDOA INFORMATION RESPONSE message. For example, the OTDOA cell information IE of the OTDOA INFORMATION RESPONSE message may include OTDOA PRS configuration information.

In operation 1105, the LMF 1150 may send an OTDOA INFORMATION REQUEST message of an NRPPa protocol, to the gNB2 1130. For example, the LMF 1150 may request OTDOA-related cell-specific information from the gNB2 1130 through the OTDOA INFORMATION REQUEST message.

In operation 1107, the gNB2 1150 may send an OTDOA INFORMATION RESPONSE message of an NRPPa protocol to the LMF 1150. The gNB2 1130 having received the request for the OTDOA information may transmit OTDOA PRS information to the LMF 1150 through an OTDOA cell information IE of the OTDOA INFORMATION RESPONSE message. For example, the OTDOA cell information IE of the OTDOA INFORMATION RESPONSE message may include OTDOA PRS configuration information.

As in operations 1101 and 1105, when (or even before) localizing the UE 1110, the LMF 1150 may request OTDOA-related information from neighboring nodes (e.g., the serving gNB 1120, the gNB2 1130, and the gNB 1140), or any nodes in a region covered by the LMF 1150.

As in operations 1103 and 1107, the gNB1 1140 and gNB2 1130 having received the request for the OTDOA-related information from the LMF 1150 may transmit PRS information (or PRS configuration information) transmitted from a specific cell provided by the gNB1 1140 and gNB2 1130 themselves, to the LMF 1150. In this case, when an physical cell identifier (PCI), a global cell identifier (ID), and an enhanced global cell ID of the corresponding cell, or a transmission point (TP) provided by the corresponding gNB exists, the transmitted PRS information may include at least one of TP ID information of the TPs served by the corresponding gNB, timing information of TPs served by the corresponding gNB, PRS configuration information of TPs served by the corresponding gNB, geographical coordinate information of TPs served by the corresponding gNB, information on a width of a beam, a length of a PRS block, a PRS bust periodicity, a PRS beam offset, a PRS beam sweeping periodicity, the number of beams used, a beam-specific index or PRS block index transmitted in a beam sweeping periodicity, a type of a reference signal included in a PRS (e.g., a type of a reference signal including at least one of an SSB, a CSI-RS, a CRS, or a DM-RS), temporal width of a symbol, or subcarrier spacing of a symbol, beam-specific angle of departure (AoD) information in each NR cell, or beam-specific angle offset information.

In FIG. 11, operations 1105 and 1107 are performed subsequent to operations 1101 and 1103, but this is a mere example. Operations 1101 and 1103 may be performed subsequent to operations 1105 and 1107. Alternatively, operations 1101 and 1103 may be simultaneously performed, and accordingly, operations 1105 and 1107 may be performed.

In operation 1109, the LMF 1150 may send a ProvideAssistanceData message of an LTE positioning protocol (LPP) to the UE 1110 through the serving gNB 1120. When the LMF 1150 receives OTDOA-related information from neighboring nodes (e.g., the gNB1 1140 and the gNB2 1130), the LMF may transmit PRS-related configuration information (hereinafter, referred to as assistance data or assistance information) of a reference cell and a neighboring cell, which are selected for the UE 1110, the UE 1110 to be localized. The transmission of the assistance data may be a response to a request by the UE 1110 for the assistance data, or may be transmission from the LMF 1150 to the UE 1110, regardless of a request by the UE 1110. According to various embodiments, the above-described assistance information may be transmitted from the LMF 1150 to the UE 1110 through an OTDOA-AssistanceData IE of the ProvideAssistanceData message. For example, the assistance information may include at least one of information on a PCI and a global cell ID for each of the reference cell and the neighboring cell, TP ID information of a candidate NR TP for measurement, TP timing information on a reference NR TP, PRS configuration information on a reference NR TP (or cell) or a candidate TP (or cell) for a reference signal timing difference (RSTD) reference, information on a system frame number (SFN) timing offset between a serving NR cell and an NR assistance data reference cell, information on a width of beam, a length of a PRS block, a PRS burst periodicity, a PRS beam offset (an offset between PRS beams), a PRS beam sweeping periodicity, the number of beams used, a PRS block index or a beam-specific index transmitted in a beam sweeping periodicity, a type of a reference signal included in a PRS (e.g., a type of a reference signal including at least one of an SSB, a CSI-RS, a CRS, or a DM-RS), temporal width of a symbol, or subcarrier spacing of a symbol, beam-specific AoD information (for detecting line of sight (LOS) or non-line of sight (NLOS)) in each NR cell, or beam-specific angle offset information.

In operation 1111, the LMF 150 may send a RequestLocationInformation message of an LPP protocol to the UE 1110 through the serving gNB 1120. After transmitting assistance data to the UE 1110, the LMF 1150 may send, to the UE 1110, a RequestLocationInformation message which is a message for requesting, from the UE 1110, transmission of measurement information. According to an embodiment, a request for transmission of measurement information may be transmitted from the LMF 1150 to the UE 1110 through an OTDOA-RequestLocationInformation IE of the RequestLocationInformation message. For example, the OTDOA-RequestLocationInformation IE of the RequestLocationInformation message may include a request for transmission of measurement information.

In operation 1113, the UE 1110 measures an RSTD for each configured PRS in each configured cell. After receiving the RequestLocationInformation message, the UE 1110 may measure an RSTD value by using PRS information of a reference cell and a neighboring cell, included in the assistance information. In this case, the UE 1110 may measure transmission time (or reception time) of PRSs transmitted through multiple beams of the reference cell and transmission time (or reception time) of PRSs transmitted through multiple beams of the neighboring cell, and determine the RSTD between the reference cell and the neighboring cell, based on the measured values. In this case, the UE 1110 may select a specific beam among the multiple beams, and consider transmission time of a PRS transmitted through the selected beam as a representative value. Here, the selected specific beam may be a beam, the PRS transmission time of which is the shortest, or a beam, the PRS reception signal strength of which is the strongest, among the multiple beams. Alternatively, when sending the ProvideAsisstanceData message, the LMF 1150 may transmit a PRS block index or a beam index indicating a specific beam (or a measurement beam) to be used by each of the reference cell and the neighboring cell for measuring PRS transmission time, to each cell. In addition, in operations 1109 and 1111, the LMF 1150 may transmit information on the measurement beam for each cell to the UE 1110 through a ProvideAssistanceData message or a separate message. In this case, the UE 1110 may measure the PRS transmission time by using the corresponding measurement beam in the corresponding cell.

In FIG. 11, the UE 1110 performs operation 1113 after receiving the RequestLocationInformation message, but this is a mere example, and the UE 1110 may perform operation 1113 in response to the reception of the ProvideAssistanceData message in operation 1109.

In operation 1115, the UE 1110 report the measured RSTD for pairs of PRSs in each of the reference cell and the neighboring cell. The UE 1110 may transmit the measured RSTD to the LMF 1150 through the serving gNB 1120. For example, the measurement information may be transmitted from the UE 1110 to the LMF 1150 through an OTDOA-SignalMeasurementInformation IE of the ProvideLocationInformation message of the LPP protocol. In this case, the transmitted measurement information may include at least one of a PCI, a global cell ID, and ECGI for each of the reference cell and the neighboring cell related to the measurement, an evolved-UTRA absolute radio frequency number (EARFCN) for the RSTD reference cell and measured neighboring cells, or a list of measurement values for each neighboring cell (e.g., the measured RSTD and the RSTD quality). Furthermore, the transmitted measurement information may further include at least one of the following information, for each pair of the reference cell and the neighboring cell:

RSTD (e.g., the RSTD at the time of measuring beams for the reference cell and the neighboring cell)

Figure 12:
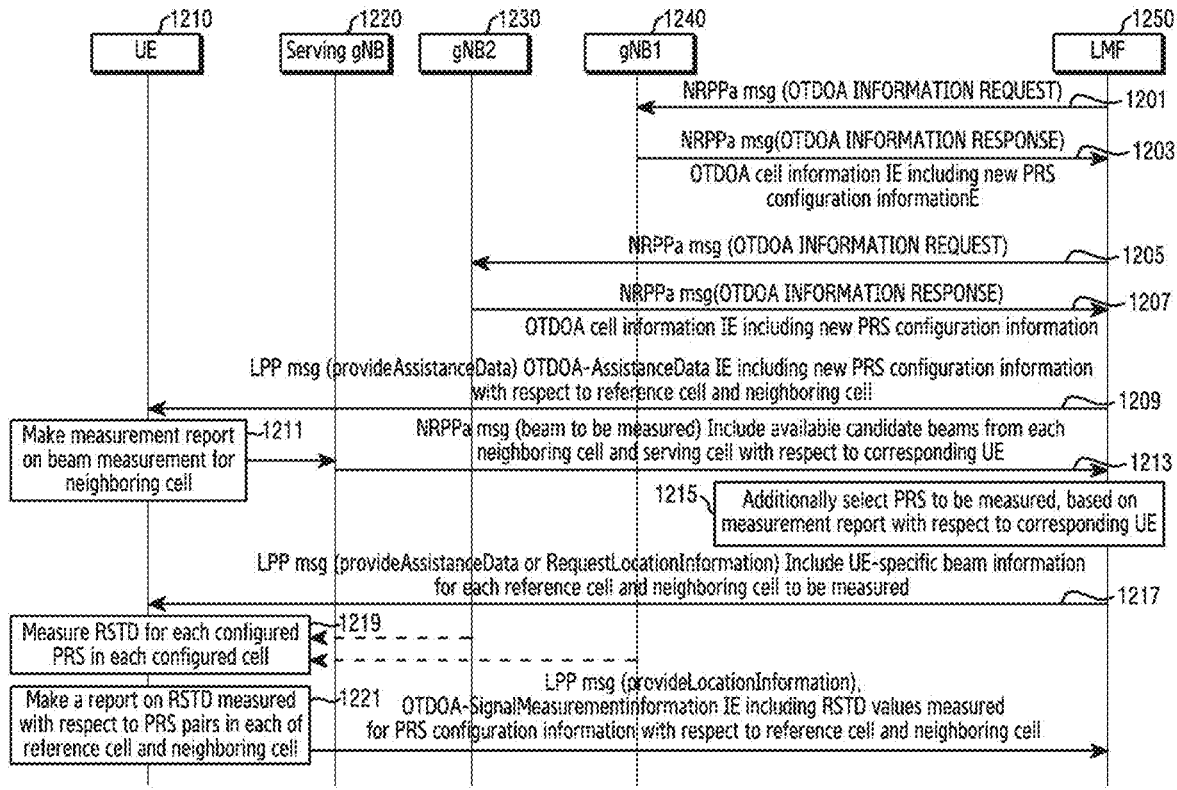
FIG. 12 illustrates a signal flow for determining a PRS measurement beam in a wireless communication system according various embodiments of the disclosure.

Beam index, PRS ID and/or PRS block index measured in the reference cell and the neighboring cell Indicator for LOS/NLOS of each beam, measured with respect to the reference cell and the neighboring cell FIG. 12 illustrates a signal flow for determining a PRS measurement beam in a wireless communication system according to various embodiments of the disclosure. In an example of FIG. 12, the UE 1210 (e.g., the terminal 120) and a serving cell of the serving gNB 1220 (e.g., the base station 110) may be in a connected state (e.g., RRC_CONNECTED state). The LMF 1250 may identify that the UE 1210 accesses the serving gNB 1220, and neighboring cells of the serving gNB 1220 are provided by the gNB2 1230 and the gNB1 1240.

Referring to FIG. 12, in operation 1201, the LMF 1250 may send an observed time difference of arrival (OTDOA) INFORMATION REQUEST message of an NR positioning protocol A (NRPPa) protocol to the gNB1 1240. For example, the LMF 1250 may request an OTDOA-related cell-specific information to the gNB1 1240 through the OTDOA INFORMATION REQUEST message.

In operation 1203, the gNB1 1240 may send an OTDOA INFORMATION

RESPONSE message of an NRPPa protocol to the LMF 1250. The gNB1 1240 having received the request for the OTDOA-related information may transmit OTDOA PRS information to the LMF 1250 through an information element (IE) of OTDOA cell information of the OTDOA INFORMATION RESPONSE message. For example, the OTDOA cell information IE of the OTDOA INFORMATION RESPONSE message may include OTDOA PRS configuration information.

In operation 1205, the LMF 1250 may send an OTDOA INFORMATION REQUEST message of an NRPPa protocol to the gNB2 1230. For example, the LMF 1250 may request OTDOA-related cell-specific information to the gNB2 1230 through the OTDOA INFORMATION REQUEST message.

In operation 1207, the gNB2 1230 may send an OTDOA INFORMATION RESPONSE message of an NRPPA protocol to the LMF 1250. The gNB2 1230 having received the request for the OTDOA information may transmit OTDOA PRS information to the LMF 1250 through OTDOA cell information IE of the OTDOA INFORMATION RESPONSE message. For example, the OTDOA cell information IE of the OTDOA INFORMATION RESPONSE message may include OTDOA PRS configuration information.

As in operations 1201 and 1205, when (or even before) localizing the UE 1210, the LMF 1250 may request OTDOA-related information from neighboring nodes (e.g., the serving gNB 1220, the gNB2 1230, the gNB1 1240), or any nodes in a region covered by the LMF 1250.

As in operations 1203 and 1207, the gNB1 1240 and the gNB2 1230 having received the request for the OTDOA-related information from the LMF 1250 may transmit PRS information (or PRS configuration information) transmitted in a specific cell provided by the gNB1 1240 and the gNB2 1230 themselves, to the LMF 1250. In this case, when a PCI, a global cell ID, and ECGI of the corresponding cell, or a TP provided by the corresponding gNB exists, the transmitted PRS information may include at least one of TP ID information of the TPs served by the corresponding gNB, timing information of TPs served by the corresponding gNB, PRS configuration information of TPs served by the corresponding gNB, geographical coordinate information of TPs served by the corresponding gNB, information on a width of a beam, a length of a PRS block, a PRS bust periodicity, a PRS beam offset, a PRS beam sweeping periodicity, the number of beams used, a beam-specific index or PRS block index transmitted in a beam sweeping periodicity, a type of a reference signal included in a PRS (e.g., a type of a reference signal including at least one of an SSB, a CSI-RS, a CRS, or a DM-RS), temporal width of a symbol, or subcarrier spacing of a symbol, beam-specific angle of departure (AoD) information in each NR cell, or beam-specific angle offset information.

In FIG. 12, operations 1205 and 1207 are performed subsequent to operations 1201 and 1203, but this is a mere example, and operations 1201 and 1203 may be performed subsequent to operations 1205 and 1207. Alternatively, operations 1201 and 1203 may be simultaneously performed, and accordingly, operations 1205 and 1207 may be performed.

In operation 1209, the LMF 1250 may send a ProvideAssistanceData message of an LTE positioning protocol (LPP) to the UE 1210 through the serving gNB 1220. When the LMF 1250 receives OTDOA-related information from neighboring nodes (e.g., the gNB1 1240 and the gNB2 1230), the LMF 1250 may transmit PRS-related configuration information (hereinafter, referred to as assistance data or assistance information) of a reference cell and a neighboring cell, which are selected for the UE 1210, to the UE 1210 to be localized. The transmission of the assistance data may be a response to a request by the UE 1210 for the assistance data, or may be transmission from the LMF 1250 to the UE 1210, regardless of a request by the UE 1210. According to various embodiments, the above-described assistance information may be transmitted from the LMF 1250 to the UE 1210 through an OTDOA-AssistanceData IE of the ProvideAssistanceData message. For example, the assistance information may include at least one of information on a PCI and a global cell ID for each of a reference cell a the neighboring cell, TP ID information of a candidate NR TP for measurement, TP timing information on a reference NR TP, PRS configuration information on a reference NR TP (or cell) or a candidate TP (or cell) for a reference signal timing difference (RSTD) reference, information on a system frame number (SFN) timing offset between a serving NR cell and an NR assistance data reference cell, information on a width of a beam, a length of a PRS block, a PRS burst periodicity, a PRS beam offset (an offset between PRS beams), a PRS beam sweeping periodicity, the number of beams used, a PRS block index or a beam-specific index transmitted in a beam sweeping periodicity, a type of a reference signal included in a PRS (e.g., a type of a reference signal including at least one of an SSB, a CSI-RS, a CRS, or a DM-RS), temporal width of a symbol, or subcarrier spacing of a symbol, beam-specific AoD information (for detecting line of sight (LOS) or non-line of sight (NLOS)) in each NR cell, or beam-specific angle offset information.

In operation 1211, the UE 1210 may transmit a measurement report on beam measurement for a neighboring cell to the serving gNB 1220. The UE 1210 may receive a measurement configuration from a serving cell (e.g., the serving gNB 1220) for radio resource management (RRM), and measure cellular reception strengths of a serving cell and neighboring cells and a reception strength of each beam, according to the measurement configuration. The UE 1210 may transmit measurement information on a strength of a cell and a beam to a serving cell through a measurement report, according to an RRM configuration.

In operation 1213, the serving gNB 1220 may send a message of an NRPPa protocol including the measurement information on the strength of the beam in the serving cell and the neighboring cells to the LMF 1250. According to various embodiments, the message of the NPPPa protocol transmitted in operation 1213 may include at least one of a cell-radio network temporary identifier (C-RNTI) which is an ID of the UE 1210, a PCI, cell group ID (CGI), ECGI, or node ID of the serving cell, a cellular strength, IDs of beams, or a strength value measured for each beam, measured in the serving cell, or a cellular strength, IDs of beams, or a strength value measured for each beam, measured in the neighboring cell.

In operation 1215, the LMF 1250 may select PRS to be measured, based on the measurement report on the UE 1210. For example, once receiving the measurement information, the LMF 1250 may select at least one measurement target beam (or measurement beam), based on the measurement information, so that the UE 1210 does not measure an RSTD for all beams in the reference cell and the neighboring cell, but rather measures an RSTD for only specific beams.

In operation 1217, the LMF 1250 may a send ProvideAssistanceData message or a RequestLocationInformation message of an LPP protocol to the UE 1210 through the serving gNB 1220. For example, the ProvideAssistanceData message or the RequestLocationInformation message may include information indicating the at least one measurement beam selected in operation 1215. The selected at least one measurement beam may be referred to as UE-specific beam information, and the ProvideAssistanceData message or the RequestLocationInformation message may include UE-specific beam information for each of the reference cell and the neighboring cell to be measured. When the UE-specific beam information is transmitted from the LMF 1250 to the UE 1210 through the ProvideAssistanceData message, the LMF 1250 may transmit the assistance data to the UE, and then send a RequestLocationInformation message which is a message for requesting, from the UE 1210, transmission of information relating to the measured RSTD, to the UE 1210. According to an embodiment, the request for transmission of the measurement information may be transmitted from the LMF 1250 to the UE 1210 through an OTDOA-RequestLocationInformation IE of the RequestLocationInformation message. For example, the OTDOA-RequestLocationInformation IE of the RequestLocationInformation message may include the request for transmission of the measurement information.

In operation 1219, the UE 1210 measures an RSTD for each PRS configured in each configured cell or a PRS transmitted through a configured beam. After receiving the RequestLocationInformation message, the UE 1210 may measure an RSTD value by using PRS information of the reference cell and the neighboring cell, included in the assistance information. In this case, the UE 1210 may measure transmission time (or reception time) of PRSs transmitted through multiple beams of the reference cell, and transmission time (or reception time) of PRSs transmitted through multiple beams of the neighboring cell, and determine an RSTD between the reference cell and the neighboring cell, based on the measured values. In this case, the UE 1210 may select a specific beam among multiple beams, and consider transmission time of a PRS transmitted through the selected beam as a representative value. Here, the selected specific beam may be a beam, the PRS transmission time of which is the shortest, or a beam, the PRS reception signal strength of which is the strongest, among the multiple beams. Alternatively, when sending the ProvideAsisstanceData message, the LMF 1250 may transmit a PRS block index or a beam index indicating a specific beam (or measurement beam) to be used by each of the reference cell and the neighboring cell for measuring PRS transmission time, to each cell. In addition, in operation 1217, the LMF 1250 may transmit information on the measurement beam for each cell to the UE 1210 through the ProvideAssistanceData message or the RequestLocationInformation message.

In this case, the UE 1210 may measure PRS transmission time by using the corresponding measurement beam in the corresponding cell.

In FIG. 12, the UE 1210 performs operation 1219 after receiving the RequestLocationInformation message, but this is a mere example, and the UE 1210 may perform operation 1219 in response to the reception of the ProvideAssistance-Data message in operation 1209.

In operation 1221, the UE 1210 may report the measured RSTD for pairs of PRSs in each of the reference cell and the neighboring cell. The UE 1210 may transmit the measured RSTD to the LMF 1250 through the serving gNB 1220. For example, the measurement information may be transmitted from the UE 1210 to the LMF 1250 through an OTDOA-SignalMeasurementInformation IE of the ProvideLocation-Information message of the LPP protocol. In this case, the transmitted measurement information may include at least one of a PCI, a global cell ID, and ECGI for each of the reference cell and the neighboring cell related to the measurement, an evolved-UTRA absolute radio frequency number (EARFCN) for the RSTD reference cell and measured neighboring cells, or a list of measurement values for each neighboring cell (e.g., the measured RSTD and the RSTD quality). Furthermore, the transmitted measurement information may further include at least one of the following information, for each pair of the reference cell and the neighboring cell:

RSTD (e.g., the RSTD at the time of measuring beams for the reference cell and the neighboring cell)

Figure 13:
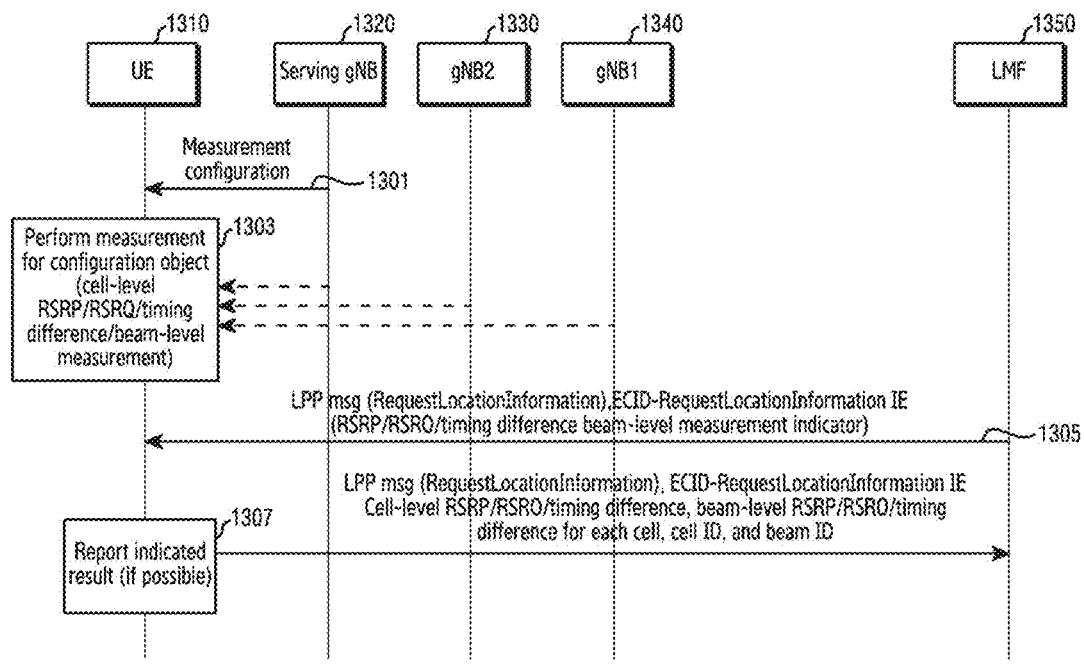
FIG. 13 illustrates a signal flow for activating an NR enhanced cell ID (ECID) in a wireless communication system according to various embodiments of the disclosure.

Beam index, PRS ID and/or PRS block index measured in the reference cell and the neighboring cell Indicator for LOS/NLOS of each beam, measured with respect to the reference cell and the neighboring cell FIG. 13 illustrates a signal flow for activating an NR enhanced cell ID (ECID) in a wireless communication system according to various embodiments of the disclosure. In an example of FIG. 13, the UE 1310 (e.g., the terminal 120) and a serving cell of the serving gNB 1320 (e.g., the base station 110) may be in a connected state (e.g., RRC_CONNECTED state).

Referring to FIG. 13, in operation 1301, the UE 1310 may receive a measurement configuration for RRM from the serving gNB 1320. The measurement configuration may include parameters required for performing the measurement by the UE 1310.

In operation 1303, the UE 1310 may perform measurement for a configured object. The UE 1310 may perform measurement for frequency cells corresponding to a measurement object included in the measurement configuration, based on the measurement configuration. The UE 1310 may obtain measurement values by performing the measurement, and the measurement values may include at least one of a signal strength (e.g., reference signal received power (RSRP), reference signal received quality (RSRQ), and/or signal to interference plus noise ratio (SINR)) of a serving cell, a signal strength (e.g., RSRP, RSRQ, and/or SINR) of a neighboring cell (e.g., a cell provided by the gNB1 1340 and the gNB2 1330), a measurement result on a strength of a beam in a serving cell (e.g., RSRP, RSRQ, and/or SINR), a measurement result on a strength of a beam in a neighboring cell (e.g., RSRP, RSRQ, and/or SINR), or a transmission (Tx)-reception (Rx) timing difference for each cell, measured by a terminal with respect to a serving cell and a neighboring cell.

According to various embodiments, the Tx-Rx timing difference may be defined as $T_{UE-RX}-T_{UE-TX}$. Here, the definition for $T_{UE-RX}$ may correspond to any one of the following description 1 to 6:

1. $T_{UE-RX}$ is the UE received timing of downlink radio frame #i from the serving cell, defined by the first detected beam carrying SSB for downlink radio frame #i;

2. $T_{UE-RX}$ is the UE received timing of downlink radio frame #i from the serving cell, defined by the first detected path in time of the DL beam carrying SSB or DL PRS for downlink radio frame #i which has the shortest propagation time;

3. $T_{UE-RX}$ is the UE perceived timing of downlink radio frame #i from the serving cell defined by the first detected beam carrying SSB for downlink radio frame #i;

4. $T_{UE-RX}$ is the UE perceived timing of downlink radio frame #i from the serving cell defined by the first detected path in time of the DL beam carrying SSB or DL PRS for downlink radio frame #i which has the shortest propagation time;

5. $T_{UE-RX}$ is the UE perceived timing of downlink radio frame boundary of radio frame #i from the serving cell, defined by the first detected beam carrying SSB for downlink radio frame #i; or 6. $T_{UE-RX}$ is the UE perceived timing of downlink radio frame boundary of radio frame #i from the serving cell, defined by the first detected path in time of the DL beam carrying SSB or DL PRS for downlink radio frame #i which has the shortest propagation time.

According to various embodiments, the definition for $T_{UE-TX}$ may correspond to any one of the following description 1 to 3:

1. $T_{UE-TX}$ is the UE transmit timing of uplink radio frame #i;

2. $T_{UE-TX}$ is the UE perceived timing of uplink radio frame #i from the serving cell; or 3. $T_{UE-TX}$ is the UE perceived timing of uplink radio frame boundary of radio frame #i from the serving cell.

In operation 1305, the LMF 1350 may send a RequestLocationInformation message of an LPP protocol to the UE 1310 through the serving gNB 1320 to enable the terminal report currently reportable ECID-related information. An ECID-RequestLocationInformation IE of the RequestLocationInformation message may include a 1-bit indicator for requesting each of RSRP, RSRQ, SINR and Tx-Rx timing difference information, among cell signal strengths for cells measured by the UE 1310. In addition, the ECID-RequestLocationInformation IE may further include a 1-bit indicator for requesting beam strength information measured for each cell. The indicator may request all available RSRP, RSRQ, SINR, and Tx-Rx timing difference information, measured for a beam. Further, according to various embodiments, beam strengths measured for each beam may be divided according to RSRP, RSRQ, SINR, and the Tx-Rx timing difference. The ECID-RequestLocationInformation IE indicates a result obtained by measuring the beam, and may include 1-bit indicators for requesting the divided RSRP, RSRS, SINR, and the Tx-Rx timing difference, respectively.

In operation 1307, the UE 1310 may transmit the measurement information requested by the RequestLocationInformation message, among available information, to the LMF 1350 through the ProvideLocationInformation message of the LPP protocol. For example, the UE 1310 may transmit the requested measurement information to the LMF 1350 through an ECID-SignalMeasurementINformation IE of the ProvideLocationInformation message. According to various embodiments, the ProvideLocationInformation message may include at least one of cell-level RSRP/RSRQ/ timing difference information, beam-level RSRP/RSRQ/ timing difference information for each cell, a cell ID, or a beam ID used for beam-level measurement.

According to various embodiments, the LMF 1350 may transmit a 1-bit indicator indicating that beam-level measurement is required, to the UE 1310. In this case, the UE 1310 may report RSRP/RSRQ/SINR/Tx-Rx timing difference for the optimum beam, together with the cell ID (e.g., PCI, ECGI, and CGI) and the beam ID (e.g., SSB index), to the LMF 1350. The 1-bit indicator may be included in a CommonIEsRequestLocationInformation or a ECID-RequestLocationInformation IE.

According to various embodiments, the LMF 1350 may indicate, in the RequestLocationInformation message, a request for a beam-level signal strength without configuring the measurement beam for the UE 1310. In this case, the UE 1310 may select the optimum beam, based on a specific metric, by the UE 1310 itself, measure RSRP/RSRQ/SINR/ Tx-Rx timing difference for the selected optimum beam, and report the measured information to the LMF 1350. Here, the specific metric for selecting the optimum beam may include at least one of a metric of selecting a beam, the reception strength of which is the strongest, among the measurable beams, or a metric of selecting a beam, the propagation delay of which is the smallest, among the measurable beams, and may be configured to the UE 1310 by the LMF 1350.

According to various embodiments, the LMF 1350 may transmit a 1-bit indicator indicating that beam-level measurement is required, to the UE 1310, and may specify the number of beams to be reported, or a specific beam to be measured (e.g., a PRS index, PRS block index, or an SSB or CSI-RS index), to the UE 1310. In this case, the UE 1310 may report a cell ID of a configured cell and RSRP/RSRQ/ Tx-Rx timing difference of the optimum beam of each cell, together with a cell ID and beam ID (e.g., an SSB or CSI-RS index), to the LMF 1350. The 1-bit indicator, the number of beams, and/or ID of a specific beam to be measured may be included in a CommonIEsRequestLocationInformation or an ECID-RequestLocationInformation IE.

Figure 14:
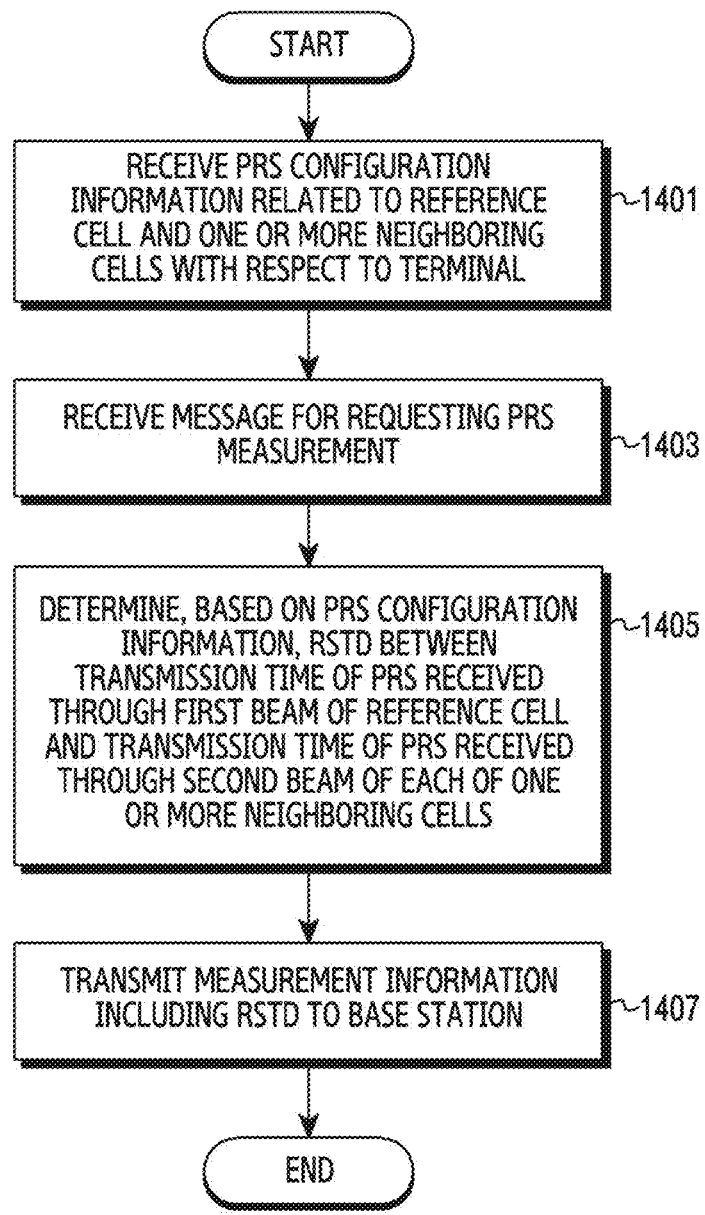
FIG. 14 illustrates a flowchart of a terminal in a wireless communication system according to various embodiments of the disclosure.

FIG. 14 illustrates a flowchart of a terminal in a wireless communication system according to various embodiments of the disclosure. FIG. 14 illustrates an operation of the terminal 120.

Referring to FIG. 14, in operation 1401, a terminal receives PRS configuration information related to a reference cell and one or more neighboring cells with respect to the terminal. The PRS configuration information may be transmitted from an LMF device to the terminal through an OTDOA-AssistanceData IE of the ProvideAssistanceData message. According to various embodiments, the reference cell may be a serving cell provided by a serving base station.

In operation 1403, the terminal receives a message for requesting PRS measurement. The request for PRS measurement may be transmitted from the LMF device to the terminal through an OTDOA-RequestLocationInformation IE of a RequestLocationInformation message.

In operation 1405, in response to the receiving of the message, the terminal determines, based on PRS configuration information, an RSTD between transmission time of a PRS received through a first beam of a reference cell, and transmission time of a PRS received through a second beam of each of one or more neighboring cells. The terminal may determine an RSTD for each pair of beams of the reference cell and the neighboring cell, based on the PRS.

In operation 1407, the terminal transmits measurement information including the RSTD to the base station. The measurement information may be transmitted from the terminal to the LMF device through an OTDOA-SignalMeasurementInformation IE of a ProvideLocationInformation message.

According to various embodiments, the terminal may perform operation 1405, regardless of receiving a message for requesting PRS measurement. In this case, operation 1403 may be omitted.

According to various embodiments, the terminal may transmit a request message for requesting the PRS configuration information, and the PRS configuration information may be received by the terminal through a response message to the request message.

According to various embodiments, a first beam may include a beam, the PRS transmission time of which is the shortest, or a beam, the PRS reception signal strength of which is the strongest, the beam being selected by the terminal from among multiple beams of the reference cell. A second beam may include a beam, the PRS transmission time of which is the shortest, or a beam, the PRS reception signal strength of which is the strongest, the beam being selected by the terminal from among multiple beams of each of one or more neighboring cells.

According to various embodiments, the PRS configuration information may include an indicator for indicating the first beam, and an indicator for indicating the second beam. The indicator for indicating the first beam and the indicator for indicating the second beam may include a beam index or a PRS block index.

According to various embodiments, the terminal may: receive a measurement configuration from the base station; determine, based on the measurement configuration, a reception signal strength with respect to multiple beams of the reference cell, and a reception signal strength with respect to multiple beams of each of the one or more neighboring cells; transmit, to the base station, a measurement report including the reception signal strength with respect to the multiple beams of the reference cell and the reception signal strength with respect to the multiple beams of each of the one or more neighboring cells; and receive a message including an indicator for indicating the first beam selected based on the measurement report, and an indicator for indicating the second beam selected based the measurement report.

According to various embodiments, the terminal may receive a 1-bit indicator for requesting beam-level measurement, and transmit, based on the beam-level measurement, measurement information including at least one of reference signal received power (RSRP), reference signal received quality (RSRQ), and a transmission-reception timing difference of a first beam, a cell identifier (ID) of a cell related to the first beam, or a beam ID of the first beam, to the base station.

Figure 15:
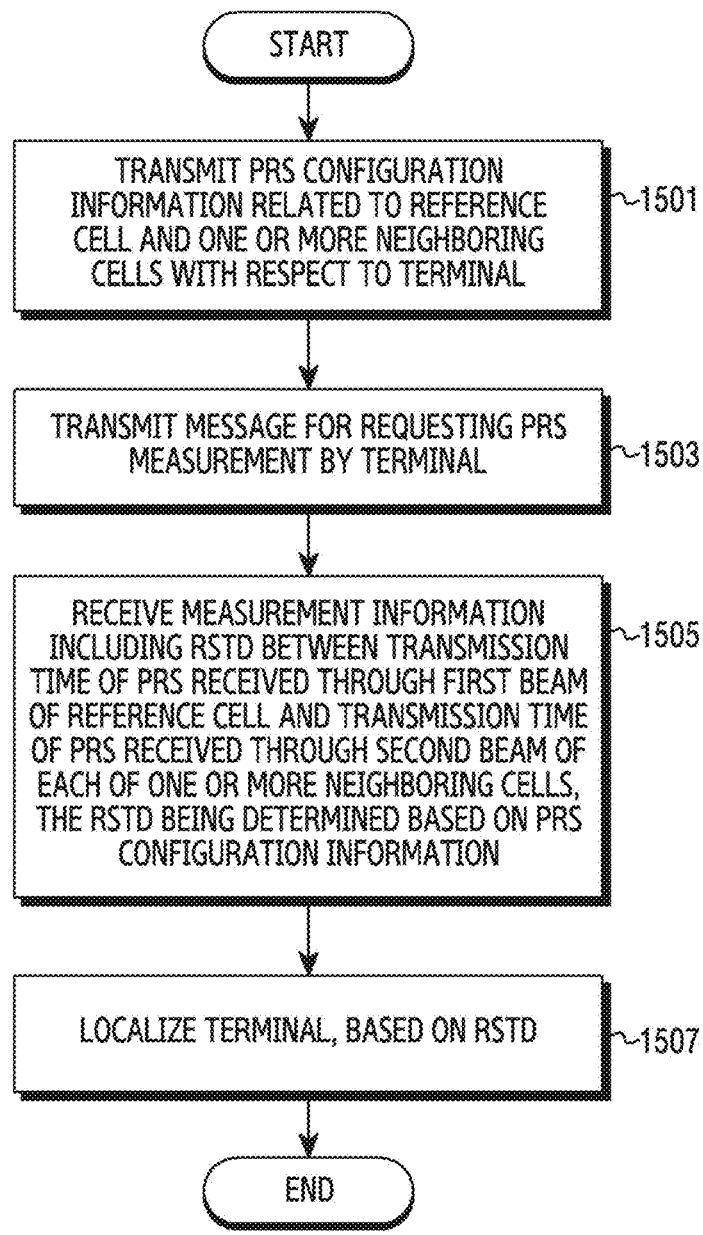
FIG. 15 illustrates a flowchart of an LMF device in a wireless communication system according various embodiments of the disclosure.

FIG. 15 illustrates a flowchart of an LMF device in a wireless communication system according to various embodiments of the disclosure. FIG. 15 illustrates operations of an LMF device having a function of the LMF 130.

Referring to FIG. 15, in operation 1501, an LMF device transmits PRS configuration information related to a reference cell and one or more neighboring cells with respect to the terminal. The PRS configuration information may be transmitted from the LMF device to the terminal through an OTDOA-AssistanceData IE of the ProvideAssistanceData message. According to various embodiments, the reference cell may be a serving cell provided by a serving base station.

In operation 1503, the LMF device may transmit a message for requesting PRS measurement by the terminal. The request for PRS measurement may be transmitted from the LMF device to the terminal through an OTDOA-RequestLocationInformation IE of a RequestLocationInformation message.

In operation 1505, the LMF device may receive measurement information including an RSTD between transmission time of a PRS received through a first beam of a reference cell, and transmission time of a PRS received through a second beam of each of one or more neighboring cells, the RSTD being determined based on PRS configuration information. The measurement information may be transmitted from the terminal to the LMF device through an OTDOA-SignalMeasurementInformation IE of a ProvideLocationInformation message.

In operation 1507, the LMF device may localize the terminal, based on the RSTD. For example, the LMF device may localize the terminal, based on the RSTD of the PRS with respect to pairs of beams of the reference cell and each of the one or more neighboring cells.

According to various embodiments, the terminal may perform PRS measurement, regardless of receiving a message for requesting PRS measurement. In this case, operation 1503 may be omitted.

According to various embodiments, the LMF device may receive a request message for requesting the PRS configuration information. The PRS configuration information may be transmitted to the terminal through a response message to the request message.

According to various embodiments, the first beam may include a beam, the PRS transmission time of which is the shortest, or a beam, the PRS reception signal strength of which is the strongest, the beam being selected by the terminal from among multiple beams of the reference cell. The second beam may include a beam, the PRS transmission time of which is the shortest, or a beam, the PRS reception signal strength of which is the strongest, the beam being selected by the terminal from among multiple beams of each of one or more neighboring cells.

According to various embodiments, the PRS configuration information may include an indicator for indicating the first beam, and an indicator for indicating the second beam. The indicator for indicating the first beam and the indicator for indicating the second beam may include a beam index or a PRS block index.

According to various embodiments, the LMF device may: receive, from the base station, a measurement report including a reception signal strength with respect to multiple beams of the reference cell, and a reception signal strength with respect to multiple beams of each of the one or more neighboring cells; determine, based on the measurement report, a first beam among the multiple beams of the reference cell, and the second beam among multiple beams of each of the one or more neighboring cells; and transmit a message including an indicator for indicating the first beam and an indicator for indicating the second beam.

According to various embodiments, the LMF device may transmit a 1-bit indicator for requesting beam-level measurement by the terminal; and receive measurement information including at least one of reference signal received power (RSRP), reference signal received quality (RSRQ), and a transmission-reception timing difference with respect to the first beam, a cell identifier (ID) related to the first beam, or a beam ID of the first beam, from the terminal through the base station.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
receiving, from a location management function (LMF) entity, at least one assistance data including at least one of information on a number of symbols associated with a positioning reference signal (PRS), information on a periodicity associated with the PRS, or an identifier (ID) of a reference transmission reception point (TRP);
determining a reference signal timing difference (RSTD) between the reference TRP and a neighbor TRP; and
transmitting, to the LMF entity, at least one measurement information including a first measurement comprising a PRS ID associated with the RSTD and the RSTD between the reference TRP and the neighbor TRP, and a second measurement comprising an ID of a TRP, a cell level measurement for the TRP, and a beam level measurement for the TRP, wherein the cell level measurement comprises a reference signal received power (RSRP) measurement for a cell and a reference signal received quality (RSRQ) measurement for the cell, wherein the beam level measurement comprises an RSRP per beam and an RSRQ per beam, and wherein the beam corresponds to an index of a synchronization signal block (SSB) or an index of a channel state information-reference signal (CSI-RS).

2. The method of claim 1, wherein the at least one assistance data further includes at least one of information on an offset associated with the PRS, information on a type of a reference signal for the PRS, information on a subcarrier spacing of a symbol associated with the PRS, or an ID of the neighbor TRP.

3. The method of claim 1, wherein the at least one measurement information further includes information on a line of sight, LOS/non-line of sight, NLOS of the reference TRP and the neighbor TRP.

4. The method of claim 1, further comprising:

receiving, from the LMF entity, information including a first index of a first beam associated with the reference TRP and a second index of a second beam associated with the neighbor TRP, wherein the RSTD is based on a difference between a first time in which the terminal receives a PRS via the first beam of the reference TRP and a second time in which the terminal receives a PRS via the second beam of the neighbor TRP.

5. The method of claim 1, further comprising:

receiving, from the LMF entity, angle information of the reference TRP and the neighbor TRP; and receiving, from the LMF entity, a message for requesting the at least one measurement information.

6. A method performed by a location management function (LMF) entity in a wireless communication system, the method comprising:

transmitting, to a terminal, at least one assistance data including at least one of information on a number of symbols associated with a positioning reference signal (PRS), information on a periodicity associated with the PRS, or an identifier (ID) of a reference transmission reception point (TRP); and receiving, from the terminal, at least one measurement information including a first measurement comprising a PRS ID associated with a reference signal timing difference (RSTD) and the RSTD between the reference TRP and a neighbor TRP, and a second measurement comprising an ID of a TRP, a cell level measurement for the TRP, and a beam level measurement for the TRP, wherein the cell level measurement comprises a reference signal received power (RSRP) measurement for a cell and a reference signal received quality (RSRQ) measurement for the cell, wherein the beam level measurement comprises an RSRP per beam and an RSRQ per beam, wherein the beam corresponds to an index of a synchronization signal block (SSB) or an index of a channel state information-reference signal (CSI-RS), and wherein the RSTD between the reference TRP and the neighbor TRP is determined.

7. The method of claim 6, wherein the at least one assistance data further includes at least one of information on an offset associated with the PRS, information on a type of a reference signal for the PRS, information on a subcarrier spacing of a symbol associated with the PRS, or an ID of the neighbor TRP.

8. The method of claim 6, wherein the at least one measurement information further includes information on a line of sight, LOS/non-line of sight, NLOS of the reference TRP and the neighbor TRP.

9. The method of claim 6, further comprising:

transmitting, to the terminal, information including a first index of a first beam associated with the reference TRP and a second index of a second beam associated with the neighbor TRP, wherein the RSTD is based on a difference between a first time in which the terminal receives a PRS via the first beam of the reference TRP and a second time in which the terminal receives a PRS via the second beam of the neighbor TRP.

10. The method of claim 6, further comprising:

transmitting, to the terminal, angle information of the reference TRP and the neighbor TRP; and transmitting, to the terminal, a message for requesting the at least one measurement information.

11. A terminal in a wireless communication system, the terminal comprising:

a transceiver; and a controller coupled with the transceiver, and configured to:

receive, from a location management function (LMF) entity, at least one assistance data including at least one of information on a number of symbols associated with a positioning reference signal (PRS), information on a periodicity associated with the PRS, or an identifier (ID) of a reference transmission reception point (TRP), determine a reference signal timing difference (RSTD) between the reference TRP and a neighbor TRP, and transmit, to the LMF entity, at least one measurement information including a first measurement comprising a PRS ID associated with the RSTD and the RSTD between the reference TRP and the neighbor TRP, and a second measurement comprising an ID of a TRP, a cell level measurement for the TRP, and a beam level measurement for the TRP, wherein the cell level measurement comprises a reference signal received power (RSRP) measurement for a cell and a reference signal received quality (RSRQ) measurement for the cell, wherein the beam level measurement comprises an RSRP per beam and an RSRQ per beam, and wherein the beam corresponds to or an index of a synchronization signal block (SSB) or an index of a channel state information-reference signal (CSI-RS).

12. The terminal of claim 11, wherein the at least one assistance data further includes at least one of information on an offset associated with the PRS, information on a type of a reference signal for the PRS, information on a subcarrier spacing of a symbol associated with the PRS, or an ID of the neighbor TRP.

13. The terminal of claim 11, wherein the at least one measurement information further includes information on a line of sight, LOS/non-line of sight, NLOS of the reference TRP and the neighbor TRP.

14. The terminal of claim 11, wherein the controller is further configured to:
  receive, from the LMF entity, information including a first index of a first beam associated with the reference TRP and a second index of a second beam associated with the neighbor TRP,
  wherein the RSTD is based on a difference between a first time in which the terminal receives a PRS via the first beam of the reference TRP and a second time in which the terminal receives a PRS via the second beam of the neighbor TRP.

15. The terminal of claim 11, wherein the controller is further configured to:
  receive, from the LMF entity, angle information of the reference TRP and the neighbor TRP, and
  receive, from the LMF entity, a message for requesting the at least one measurement information.

16. A location management function (LMF) entity in a wireless communication system, the LMF entity comprising:
  a transceiver; and
  a controller coupled with the transceiver, and configured to:
    transmit, to a terminal, at least one assistance data including at least one of information on a number of symbols associated with a positioning reference signal (PRS), information on a periodicity associated with the PRS, or an identifier (ID) of a reference transmission reception point (TRP), and
    receive, from the terminal, at least one measurement information including a first measurement comprising a PRS ID associated with a reference signal timing difference (RSTD) and the RSTD between the reference TRP and a neighbor TRP, and a second measurement comprising an ID of a TRP, a cell level measurement for the TRP, and a beam level measurement for the TRP,
  wherein the cell level measurement comprises a reference signal received power (RSRP) measurement for a cell and a reference signal received quality (RSRQ) measurement for the cell,
  wherein the beam level measurement comprises an RSRP per beam and an RSRQ per beam,
  wherein the beam corresponds to or an index of a synchronization signal block (SSB) or an index of a channel state information-reference signal (CSI-RS), and
  wherein the RSTD between the reference TRP and the neighbor TRP is determined.

17. The LMF entity of claim 16,
  wherein the at least one assistance data further includes at least one of information on an offset associated with the PRS, information on a type of a reference signal for the PRS, information on a subcarrier spacing of a symbol associated with the PRS, or an ID of the neighbor TRP.

18. The LMF entity of claim 16,
  wherein the at least one measurement information further includes information on a line of sight, LOS/non-line of sight, NLOS of the reference TRP and the neighbor TRP.

19. The LMF entity of claim 16, wherein the controller is further configured to:
  transmit, to the terminal, information including a first index of a first beam associated with the reference TRP and a second index of a second beam associated with the neighbor TRP,
  wherein the RSTD is based on a difference between a first time in which the terminal receives a PRS via the first beam of the reference TRP and a second time in which the terminal receives a PRS via the second beam of the neighbor TRP.

20. The LMF entity of claim 16, wherein the controller is further configured to:
  transmit, to the terminal, angle information of the reference TRP and the neighbor TRP, and
  transmit, to the terminal, a message for requesting the at least one measurement information.

\* \* \* \* \*